(12) United States Patent
Preston et al.

(10) Patent No.: US 11,017,469 B2
(45) Date of Patent: May 25, 2021

(54) SYSTEM AND METHOD FOR MANUFACTURING AND TRADING SECURITIES AND COMMODITIES

(71) Applicant: Elixsys Inc., Bainbridge Island, WA (US)

(72) Inventors: Joseph D. Preston, Bainbridge Island, WA (US); William R. Rieger, Atlanta, GA (US); Dan Alan Preston, Bainbridge Island, WA (US); Brett C. Simpson, Richland, WA (US)

(73) Assignee: Clarovia Holdings, LLC, Bainbridge Island, WA (US)

( * ) Notice: Subject to any disclaimer, the term of this patent is extended or adjusted under 35 U.S.C. 154(b) by 139 days.

(21) Appl. No.: 15/669,870

(22) Filed: Aug. 4, 2017

(65) Prior Publication Data
US 2019/0026828 A1    Jan. 24, 2019

Related U.S. Application Data

(60) Provisional application No. 62/371,098, filed on Aug. 4, 2016.

(51) Int. Cl.
*G06Q 40/00* (2012.01)
*G06Q 40/04* (2012.01)
*H04L 29/06* (2006.01)
*G06F 9/46* (2006.01)
*H04L 9/32* (2006.01)

(52) U.S. Cl.
CPC .............. *G06Q 40/04* (2013.01); *G06F 9/465* (2013.01); *H04L 9/3239* (2013.01); *H04L 63/08* (2013.01); *H04L 63/10* (2013.01); *H04L 2209/38* (2013.01); *H04L 2209/76* (2013.01)

(58) Field of Classification Search
CPC ........ G06Q 40/00; G06Q 40/04; H04L 63/10; G06F 9/465
See application file for complete search history.

(56) References Cited

U.S. PATENT DOCUMENTS

| | | | |
|---|---|---|---|
| 7,765,481 B2 * | 7/2010 | Dixon | .................... G06Q 30/06 715/738 |
| 9,436,923 B1 | 9/2016 | Sriram et al. | |
| 9,641,338 B2 | 5/2017 | Sriram et al. | |
| 9,849,364 B2 | 12/2017 | Tran et al. | |
| 10,171,245 B2 | 1/2019 | Wilkins et al. | |
| 10,417,217 B2 | 9/2019 | Pierce et al. | |

(Continued)

FOREIGN PATENT DOCUMENTS

WO    2005073882 A1    8/2005

OTHER PUBLICATIONS

Lael Brainard, The Use of Distributed Ledger Technologies in Payment, Clearing, and Settlement, Apr. 14, 2016, Institute of International Finance, web, 2-12 (Year: 2016).*

(Continued)

*Primary Examiner* — I Jung Liu
(74) *Attorney, Agent, or Firm* — Polsinelli PC

(57) ABSTRACT

Systems and methods are disclosed for a distributed trading system. The preferred invention offer solutions to problems that arise with High-Frequency Trading and the future of stock market regulation. The use of a distributed object brokered interface to facilitate transactions not only makes the trading faster but also more secure.

7 Claims, 27 Drawing Sheets

(56) References Cited

U.S. PATENT DOCUMENTS

| | | |
|---|---|---|
| 10,552,905 B2 | 2/2020 | Wager et al. |
| 2007/0112645 A1 | 5/2007 | Traynor et al. |
| 2008/0005006 A1* | 1/2008 | Tritt ................ G06Q 40/00 705/36 R |
| 2012/0253852 A1* | 10/2012 | Pourfallah ......... G06Q 40/08 705/41 |
| 2014/0188675 A1* | 7/2014 | Brown ............... G06Q 40/12 705/30 |
| 2017/0091847 A1 | 3/2017 | Cama et al. |
| 2019/0080392 A1 | 3/2019 | Youb et al. |

OTHER PUBLICATIONS

"A Next Generation Smart Contract & Decentralized Application Platform"; Vitalik Buterin, 2014, 36 pages.
"A Revolution in Trust Distributed Ledger Technology in Relief & Development"; Mercy Corps, May 2017, 55 pages.
"BlockChain Technology Beyond Bitcoin"; Crosby et al., Berkely Engineering, Oct. 16, 2015, 35 pages.

* cited by examiner

| Layer 7 | Application |
| Layer 6 | Presentation |
| Layer 5 | Session |
| Layer 4 | Transport |
| Layer 3 | Network |
| Layer 2 | Data Link |
| Layer 1 | Physical |

FIG. 1

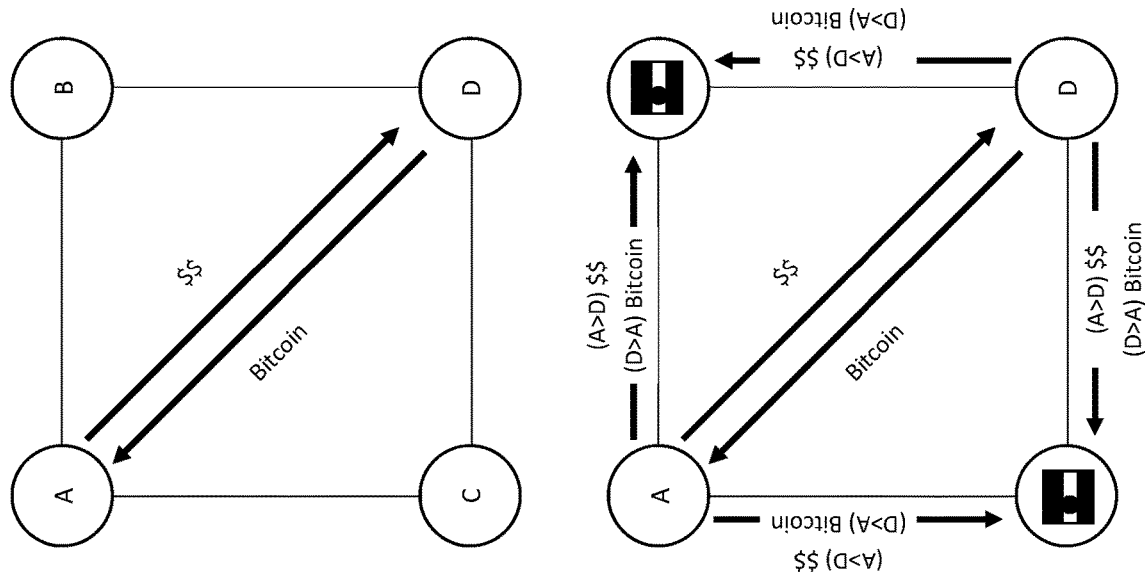
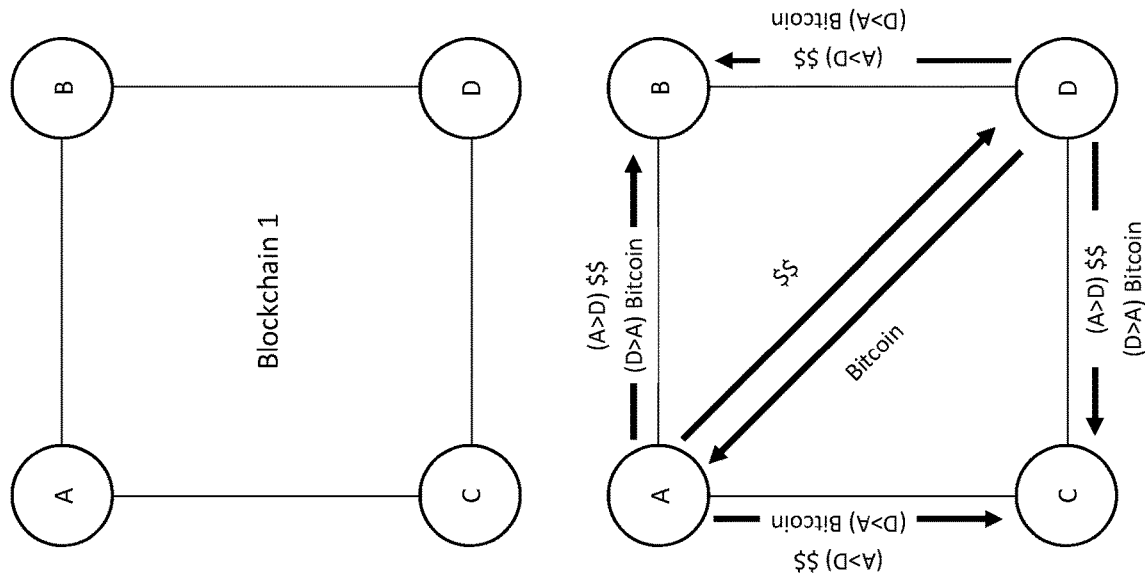
FIG. 14

SYSTEM AND METHOD FOR MANUFACTURING AND TRADING SECURITIES AND COMMODITIES

RELATED FILINGS

Due to the complexity and diversity of the inventions it is necessary to disclose in a four application filing process, where the applications may be a combination of continuations or continuations in part, and all incorporated by reference in their entirety. The first application entitled "System and Method for Distributed Trading Platform" claims priority to provisional application 62/371,098 filed Aug. 4, 2016. This application will introduce a system of systems generally covered for both context and continuity. Application one, herein, discloses an overview of the systems elements as outlined in FIG. 26 with a specific focus on the underlying communications architecture, and how it may be implemented on a legacy trading network.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to exchange trading systems and servers, operating in a coordinated, centralized and integrated systems of computers and servers; and the evolution to the simultaneous implementation of new systems and methods for a communications infrastructure across legacy systems that are implemented such that a distributed trading architecture operating across the legacy systems can operate independently on diverse platforms.

BACKGROUND

This disclosure relates generally to exchange trading systems and servers, operating in a coordinated, centralized and integrated systems of computers and servers; and the evolution to the simultaneous implementation of new systems and methods for a communications infrastructure across legacy systems that are implemented such that a distributed trading architecture operating across the legacy systems can operate independently on diverse platforms.

This approach allows collaboration between systems running on different operating systems, programming languages, and computing hardware to operate as distributed objects using remote method invocations for message passing through communications primitives. This occurs between OSI layers 2-4 and bound down at layer 5. This system is predicated on the use of one centralized server or collocated bank of servers operating as one, this is done to facilitate, and speed up electronic trading for the distributed trading system. Further, the distributed trading system implements a centralized ledger, centralized authentication and distributed information transfer between parties.

Generally, the application discloses implementing a Blockchain Ledger in support of a distributed ledger based peer to peer transaction, executed in a centralized server of a licensed exchange operating on a legacy network. The invention discloses an embodiment of communicating across the existing networks by implementing an object request brokered communications channel for message passing in support of a centralized leger that documents a distributed secure peer to peer transaction.

Within the current network structure of Public Stock Exchanges, there are inefficiencies that can be solved by a proprietary application of emerging technologies. Currently a registered broker dealer must deal with many middle men, and stops when fulfilling a trade. This can be erradicated by the inclusion of a Distributed Market Exchange. By removing a centralized server for order matching, an inclusion of peer to peer transaction may not only make trading faster and more secure. It may negate and eliminate the ability for firms outside of the ones engaging in trade to influence the trade, for example front-running of trades would be impossible. This system may be completely compliant with upcoming SEC regulations and future proof the market against other emerging technologies.

High-frequency trading (HFT) is a program trading platform that uses powerful computers to transact a large number of orders at very fast speeds. High-frequency trading uses complex algorithms to analyze multiple markets and execute orders based on market conditions. Typically, the traders with the fastest execution speeds are be more profitable than traders with slower execution speeds. As of 2009, it is estimated more than 50% of exchange volume comes from high-frequency trading orders.

Front running is the unethical practice of a stockbroker executing orders on a security for its own account while taking advantage of advance knowledge of pending orders from its customers. The front running broker either buys for its own account before filling customer buy orders that drive up the price, or sells for its own account before filling customer sell orders that drive down the price. Front running is considered unethical since the broker is making a profit at the direct expense of its own customers. Companies can achieve this faster information through co-location.

Co-locating computers owned by HFT firms and proprietary traders in the same premises where an exchange's computer servers are housed, enables HFT firms to access stock prices a split second before the rest of the investing public. Co-location has become a lucrative business for exchanges, which charge HFT firms millions of dollars for the privilege of "low latency access." As Lewis explains in "Flash Boys," the huge demand for co-location is a major reason why some stock exchanges have expanded their data centers substantially. While the old New York Stock Exchange building occupied 46,000 square feet, the NYSE Euronext data center in Mahwah, N.J. is almost nine times larger, at 398,000 square feet.

A type of HFT trading wherein an exchange will "flash" information about buy and sell orders from market participants to HFT firms for a few fractions of a second before the information is made available to the public. Flash trading is controversial because HFT firms can use this information edge to trade ahead of pending orders, which can be construed as front running. U.S. Senator Charles Schumer had urged the Securities and Exchange Commission in July 2009 to ban flash trading, saying that it created a two-tiered system where a privileged group received preferential treatment, while retail and institutional investors were put at an unfair disadvantage and deprived of a fair price for their transactions.

The time that elapses from the moment a signal is sent to its receipt. Since lower latency equals faster speed, high-frequency traders spend heavily to obtain the fastest computer hardware, software and data lines so as execute orders as speedily as possible and gain a competitive edge in trading. The biggest determinant of latency is the distance that the signal has to travel, or the length of the physical cable (usually fiber-optic) that carries data from one point to another. Since light in a vacuum travels at 186,000 miles per second or 186 miles a millisecond, a HFT firm with its servers co-located right within an exchange would have a much lower latency—and hence a trading edge—than a rival firm located miles away. Interestingly, an exchange's co-location clients receive the same amount of cable length regardless of where they are located within the exchange premises, so as to ensure that they have the same latency.

Bitcoin is a digital asset and a payment system invented by Satoshi Nakamoto. Nakamoto introduced the idea on 31 Oct. 2008 to a cryptography mailing list, and released it as open-source software in 2009. There have been several high profile claims to the identity of Satoshi Nakamoto; however, none of them have provided proof beyond doubt that back up their claims.

The system is peer-to-peer and transactions take place between users directly, without an intermediary. These transactions are verified by network nodes and recorded in a public distributed ledger called the blockchain, which uses bitcoin as its unit of account. Since the system works without a central repository or single administrator, the U.S. Treasury categorizes bitcoin as a decentralized virtual currency. Bitcoin is often called the first cryptocurrency, although prior systems existed and it is more correctly described as the first decentralized digital currency. Bitcoin is the largest of its kind in terms of total market value.

Bitcoins are created as a reward for payment processing work in which users offer their computing power to verify and record payments into a public ledger. This activity is called mining and miners are rewarded with transaction fees and newly created bitcoins. Besides being obtained by mining, bitcoins can be exchanged for other currencies, products, and services. When sending bitcoins, users can pay an optional transaction fee to the miners.

In February 2015, the number of merchants accepting bitcoin for products and services passed 100,000. Instead of 2-3% typically imposed by credit card processors, merchants accepting bitcoins often pay fees in the range from 0% to less than 2%. Despite the fourfold increase in the number of merchants accepting bitcoin in 2014, the cryptocurrency did not have much momentum in retail transactions. The European Banking Authority and other sources have warned that bitcoin users are not protected by refund rights or chargebacks. The use of bitcoin by criminals has attracted the attention of financial regulators, legislative bodies, law enforcement, and media. Criminal activities are primarily centered around darknet markets and theft, though officials in countries such as the United States also recognize that bitcoin can provide legitimate financial services.

A blockchain is a public ledger of all Bitcoin transactions that have ever been executed. It is constantly growing as 'completed' blocks are added to it with a new set of recordings. The blocks are added to the blockchain in a linear, chronological order. Each node (computer connected to the Bitcoin network using a client that performs the task of validating and relaying transactions) gets a copy of the blockchain, which gets downloaded automatically upon joining the Bitcoin network. The blockchain has complete information about the addresses and their balances right from the genesis block to the most recently completed block.

Typical exchanges today operate on private networks and private servers behind deep firewalls. They offer access to their system through a computer configured to access their network for receiving information, or allowing trade information messages to occur. As an example, Bloomberg's Trade book operates behind the global Bloomberg network. Making wholesale changes to these networks are difficult or near impossible. They have been build up over the years to meet the numerous missions Bloomberg operating companies require; gaining access for any purpose requires years of planning. The precious metals trading platform this application proposes may implement on an existing platform across legacy networks with an existing exchange for many strategic reasons, including credibility, access, regulations.

The challenge for this will be disruption to any other operation using the closed system of networks and servers. This implementation would be further complicated by using the centralized proxy based system with a decentralized system pointed to a single server for ledger management.

The utilization of a distributed ledger is the most robust technological advancement in transaction mechanisms within the last decade. Applicable to a plurality of opportunities, the system and methods disclosed herein utilize a distributed ledger and authentication system through a specialized process. The invention may use a distributed ledger to represent a basket of rare-earth metals, track the distribution of this basket through a shipping network, create a coin representing the market value of the basket, trade the coin on an exchange network, and maintain and optimize the fulfillment and ultimate delivery of the basket to its ending location.

An exchange-traded fund (ETF) is an investment fund traded on stock exchanges, much like stocks. An ETF holds physical assets such as stocks, bonds or commodities. With a focus on the last, the applicants cite as a non-limiting example of an ETF, precious metals backed ETFs, e.g. SPDR. Gold Shares ETF; iShares Silver Trust ETF; and ETFS (GLTR) Precious Metals Baskets Trust. GLTR, it is a physically backed ETF with broader baskets of physical metals, rather than holding just one precious metal its portfolio includes physical gold, physical silver, physical platinum and physical palladium. Each of these ETFs sited above generally operate with an arbitrage mechanism designed to keep it trading close to its net asset value, although deviations can occasionally occur. Most ETFs track an index, such as a stock index or bond index. ETFs may be attractive as investments because of their low costs, tax efficiency, and stock-like features. By 2013, ETFs had become the most popular type of exchange-traded product.

Generally, all ETFs derive their value from the current value of an underlying portfolio of assets. The ETF is traded intraday on the same exchange as the underlying basket creating arbitrage opportunities. These arbitrage opportunities stabilize the price of the ETF forcing its Net Asset Value (NAV) to avoid being over or undervalued relative to the basket of its representative portfolio. The basket of rare earth metals will behave similarly. The current market value of individual commodities contained therein will value the basket. Although the basket's value will fluctuate due to market demand, on the delivery of the contract the value will revert to the NAV. This put-call parity is a normal occurrence within a market involving derivatives and the arbitrage opportunities are expected.

What is needed are systems and methods the allows the formation of a distributed network bound down to the networks at layer 5, pointed to a server and port, where it is picked off by a network appliance collocated proximate to the servers, wherein the appliance is configured to forward traffic to a second server, carrying messages to the second server to be incorporate in a record related to the messages, and stored back in the second server. The key to this approach is messaging such that the traffic and messages are "invisible" to the legacy networks.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE FIGURES

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures. The presently preferred embodiments are illustrated in the accompanying drawings, in which:

FIG. 1 depicts the Open Systems Interconnect Model (OSI Model).
FIG. 14 depicts Bitcoin's Blockchain.

Figure 2:
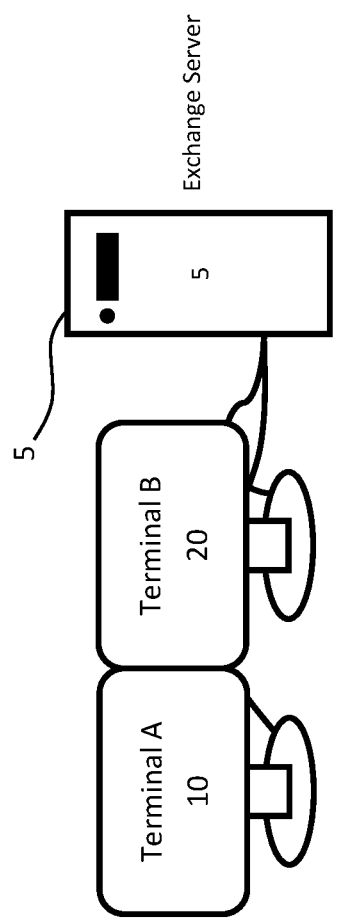
FIG. 2 depicts the terminal description.

Elements and acts in the figures are illustrated for simplicity and have not necessarily been rendered according to any particular sequence or embodiment.

DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

The utilization of a distributed ledger is the most robust technological advancement in transaction mechanisms within the last decade. Applicable to a plurality of opportunities, the system and methods disclosed herein utilize a distributed ledger and authentication system through a specialized process. A distributed ledger may be used to represent a basket of rare-earth metals, track the distribution of this basket through a shipping network, create a coin representing the market value of the basket, trade the coin on an exchange network, and maintain and optimize the fulfillment and ultimate delivery of the basket to its ending location.

Coal burning power plants, regardless of whether or not they are producing energy that is used, produce a byproduct known as fly ash. Normally considered a waste product, fly ash is not only costly to transport but costly to store due to environmental regulation. Through a proprietary process rare earths and other commodities may be extracted from fly ash and other metal-bearing feedstock. These extracted materials may be represented by a basket. The basket of materials may be traded on a commodities exchange in order for liquidation. The expectation is that coal burning power plants will subscribe to the network in order to monetize their waste product. Coal-burning power plants and fly ash are used as examples herein but these same systems and methods may be applied to other plants and waste streams not explicitly disclosed herein.

Due to the high volume of rare earth metals in fly ash, traditional commodities exchanges will not work due to price sensitivity. The use of proprietary distributed ledger technology is necessary in order to revolutionize the process. Each basket of rare earth metals created will be assigned a hash-code on the distributed ledger. This hash-code will remain alive throughout the life of the basket, timing out on its eventual delivery. The ledger will also provision each user with a hash-code that will be applied to a basket indicating current ownership. The code will also represent the basket of rare earth metals to be traded on a proprietary exchange. Users will also be able to trade derivative contracts based on future delivery of the basket using a smart contract application in place.

An exchange-traded fund (ETF) is an investment fund traded on stock exchanges, much like stocks. An ETF holds physical assets such as stocks, bonds or commodities. With a focus on the last, the applicants cite as a non-limiting example of an ETF, precious metals backed ETFs, e.g. SPDR Gold Shares ETF; iShares Silver Trust ETF; and ETFS (GLTR) Precious Metals Baskets Trust. GLTR, it is a physically backed ETF with broader baskets of physical metals, rather than holding just one precious metal its portfolio includes physical gold, physical silver, physical platinum and physical palladium. Each of these ETFs sited above generally operate with an arbitrage mechanism designed to keep it trading close to its net asset value, although deviations can occasionally occur. Most ETFs track an index, such as a stock index or bond index. ETFs may be attractive as investments because of their low costs, tax efficiency, and stock-like features. By 2013, ETFs had become the most popular type of exchange-traded product.

Generally, all ETFs derive their value from the current value of an underlying portfolio of assets. The ETF is traded intraday on the same exchange as the underlying basket creating arbitrage opportunities. These arbitrage opportunities stabilize the price of the ETF forcing its Net Asset Value (NAV) to avoid being over or undervalued relative to the basket of its representative portfolio. The basket of rare earth metals will behave similarly. The current market value of individual commodities contained therein will value the basket. Although the basket's value will fluctuate due to market demand, on the delivery of the contract the value will revert to the NAV. This put-call parity is a normal occurrence within a market involving derivatives and the arbitrage opportunities are expected.

The proprietary exchange itself will operate and fluidly maintain a distributed network through a plurality of micro networks amongst its users. The micro networks will operate transactions within a small number of users. This increases the speed and efficiency of the exchange network. At predetermined time intervals, each user will send their most up to date chain of transactions representing the net change in assets over the time-period to a centralized exchange for compilation and the other networks of users. The centralized exchange will document and store the complete ledger in order to mitigate the threat of fraudulent transactions. The exact specifications and definition of the transactions are defined therein.

The centralized network of servers may manage the manufacture and distribution network of products in and from the process. The distributed ledger offers unparalleled accuracy in supply chain management, consistently maintaining an accurate location in the process. This will limit or completely negate the potential loss of material in the process and further develop the intricate system. Successful implementation will not only redefine commodities trading but also supply chain management.

In a non-limiting example, implementing a Common Object Request Brokered Architecture, or CORBA, enables communication between software written in different languages and running on different computers. Implementation details from specific operating systems, programming languages, and hardware platforms are all removed from the responsibility of developers. CORBA normalizes the method-call semantics between application objects residing either in the same address-space (application) or in remote address-spaces (same host, or remote host on a network). Version 1.0 was released in October 1991.

CORBA uses an interface definition language (IDL) to specify the interfaces that objects present to the outer world. CORBA then specifies a mapping from IDL to a specific implementation language like C++ or Java. Standard mappings exist for Ada, C, C++, C++11, COBOL, Java, Lisp, PL/I, Object Pascal, Python, Ruby and Smalltalk. Non-standard mappings exist for C #, Erlang, Perl, Tcl and Visual Basic implemented by object request brokers (ORBs) written for those languages.

The CORBA specification dictates there shall be an ORB through which an application would interact with other objects. This is how it is implemented in practice:

The application simply initializes the ORB, and accesses an internal Object Adapter, which maintains things like reference counting, object (and reference) instantiation policies, and object lifetime policies.

The Object Adapter is used to register instances of the generated code classes. Generated code classes are the result of compiling the user IDL code, which translates the high-level interface definition into an OS- and language-specific class base for use by the user application. This step is necessary in order to enforce CORBA semantics and provide a clean user process for interfacing with the CORBA infrastructure.

Some IDL mappings are more difficult to use than others. For example, due to the nature of Java, the IDL-Java mapping is rather straightforward and makes usage of CORBA very simple in a Java application. This is also true of the IDL to Python mapping. The C++ mapping requires the programmer to learn datatypes that predate the C++ Standard Template Library (STL). By contrast, the C++11 mapping is easier to use, but requires heavy use of the STL. Since the C language is not object-oriented, the IDL to C mapping requires a C programmer to manually emulate object-oriented features.

In order to build a system that uses or implements a CORBA-based distributed object interface, a developer must either obtain or write the IDL code that defines the object-oriented interface to the logic the system will use or implement. Typically, an ORB implementation includes a tool called art IDL compiler that translates the IDL interface into the target language for use in that part of the system. A traditional compiler then compiles the generated code to create the linkable-object files for use in the application.

FIG. 1 depicts physical method for the Open Systems interconnection model (OSI model) which is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defined seven layers. A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

The focus of this application is a session based (layer 5) binding down to 4-2 using and exploiting the primitive messaging between the layers to invoke an object request brokered communication to effect a "black channel" communication in an existing network to not disrupt operations of the networks stock exchange system. The Black Channel effectively supports what is termed an asset backed "dark pool" of securities.

FIG. 2 depicts terminal A and terminal B sitting on a trading desk, riding on the same networks and connected to the same local server 5, where 5 is pointed to a second server, in support of stock trades, where terminal B is in support of dark pool asset trades.

Figure 3:
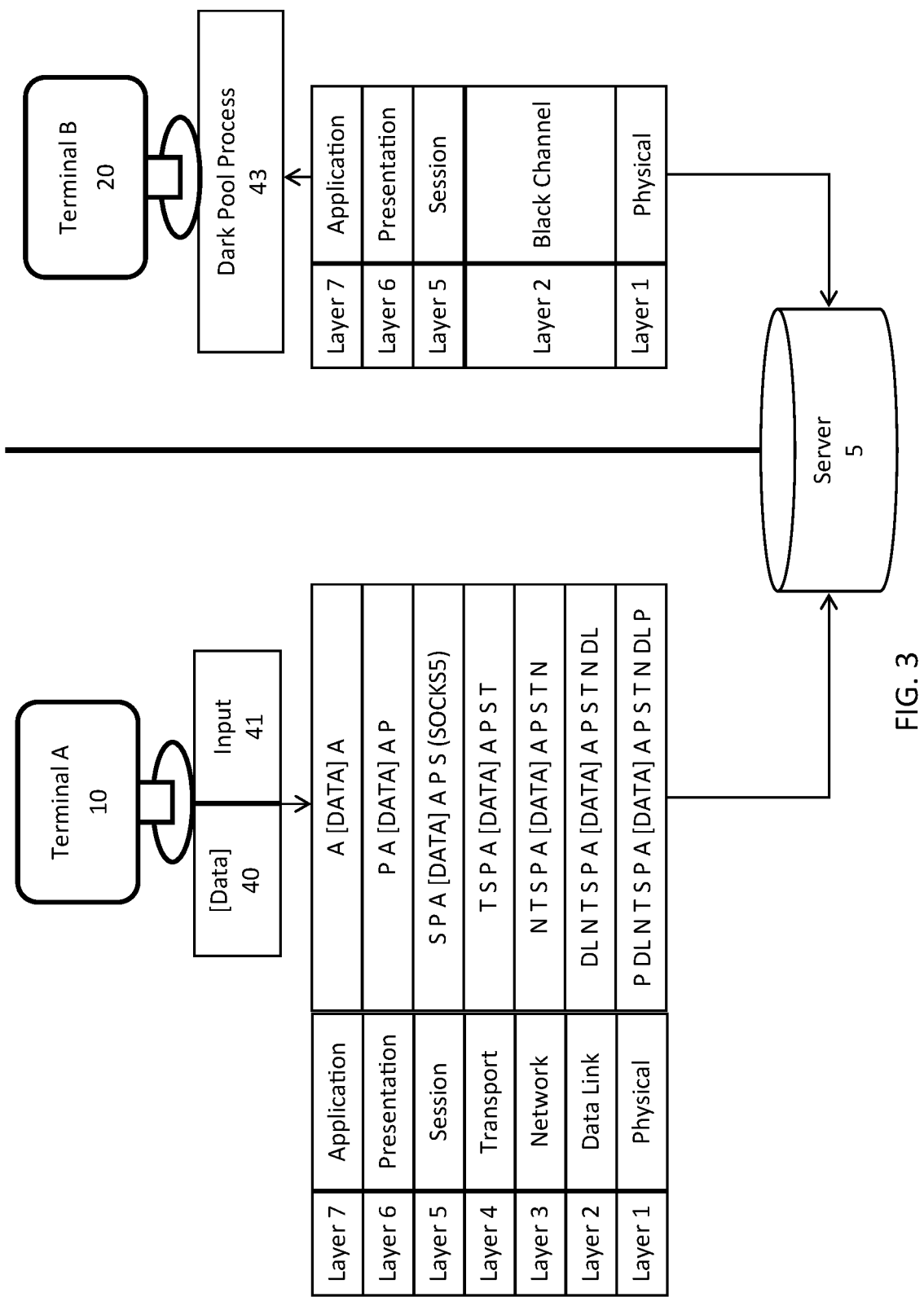
FIG. 3 depicts the basic datagram between two terminals.

FIG. 3 better illustrates the standard trading platform 10 collocated with Dark Terminal B 20 riding on the same local networks and local server 5, both pointed to a second server. The trading terminal bound by SOCKS5 and the dark terminal bound for layer 2 forwarding through the black channel. The black channel data is bound out through the Black channel stacks in the Terminal B Dark Pool process 43.

Figure 4:
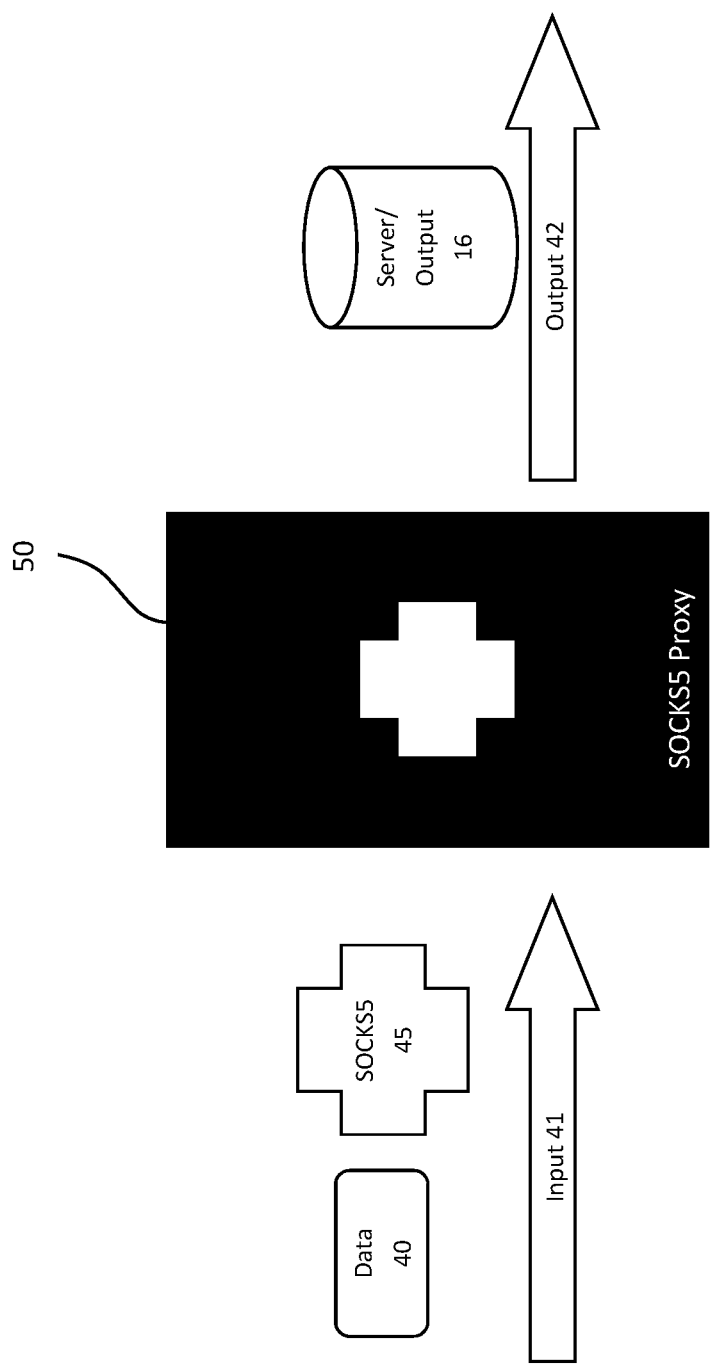
FIG. 4 depicts a SOCKS5 proxy

FIG. 4 illustrates the preferred embodiment for the physical method for a SOCKS5 Proxy 50. Socket Secure (SOCKS) is an Internet protocol that exchanges network packets between a client and server through a proxy server. SOCKS5 additionally provides authentication so only authorized users may access a server. Practically, a SOCKS5 server proxies TCP connections to an arbitrary IP address, and provides a means for UDP packets to be forwarded. Without the specific SOCKS5 address, the data cannot pass through the proxy to the server or output location.

Figure 5:
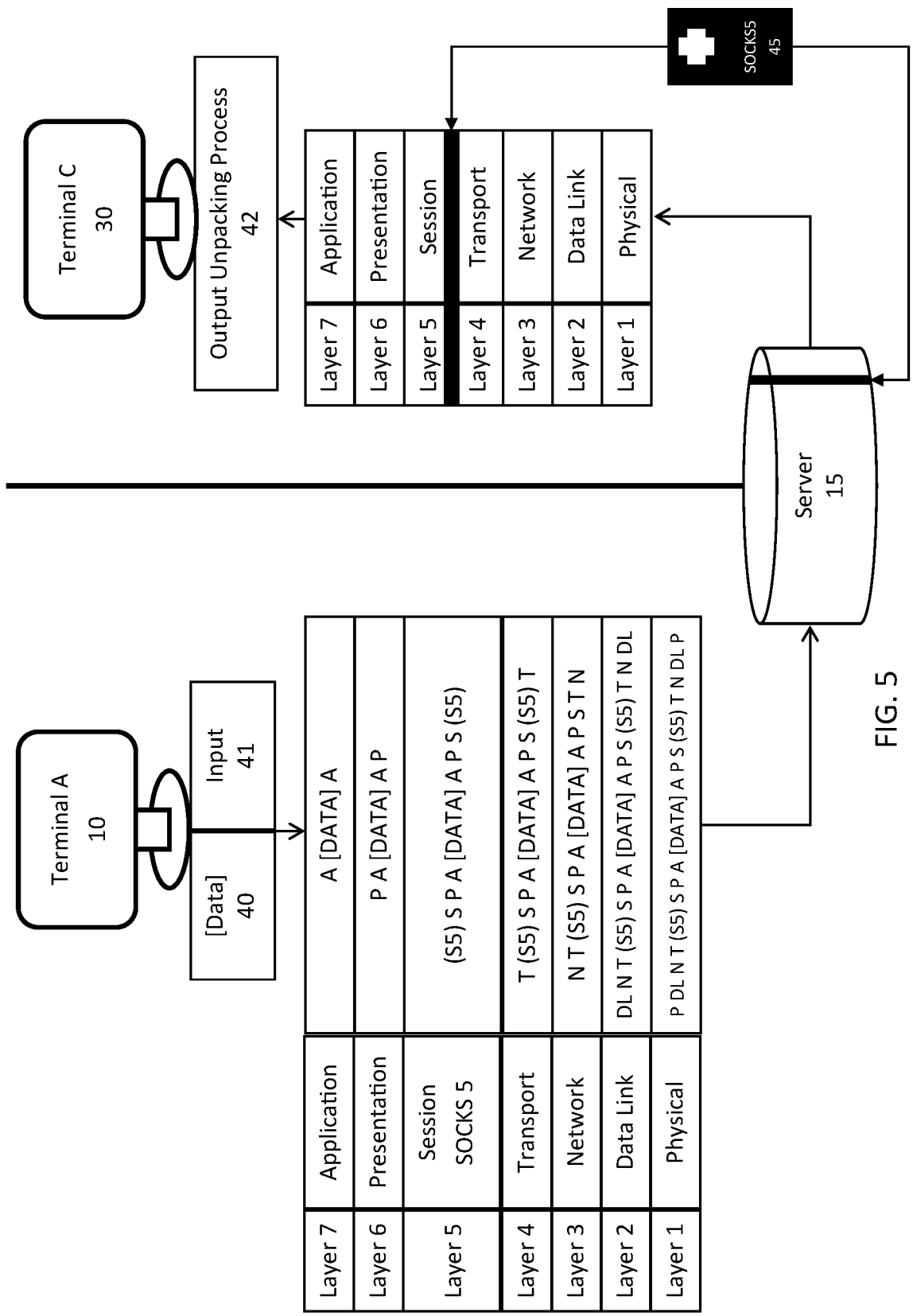
FIG. 5 depicts a datagram with a SOCKS5 proxy.

FIG. 5 illustrates the preferred embodiment for the physical method for a SOCKS5 Proxy as represented in the datagram of the OSI Model. The OSI Model is displayed to show the transfer of information from an application running on Terminal A to a similar application on Terminal C 30. The model is expanded to show the suffixes and prefixes added to the data (represented by [DATA]) to facilitate the transfer of information between layers. At Layer 5, the session layer, a SOCKS5 proxy is added and this change is delineated by the "(S5)" suffix and prefix to the networking packet. Both the server the networking packet passes through and Terminal B have the SOCKS5 proxy to allow the information through. If these did not have the SOCKS5 proxy, the information would be abandoned.

Figure 6:
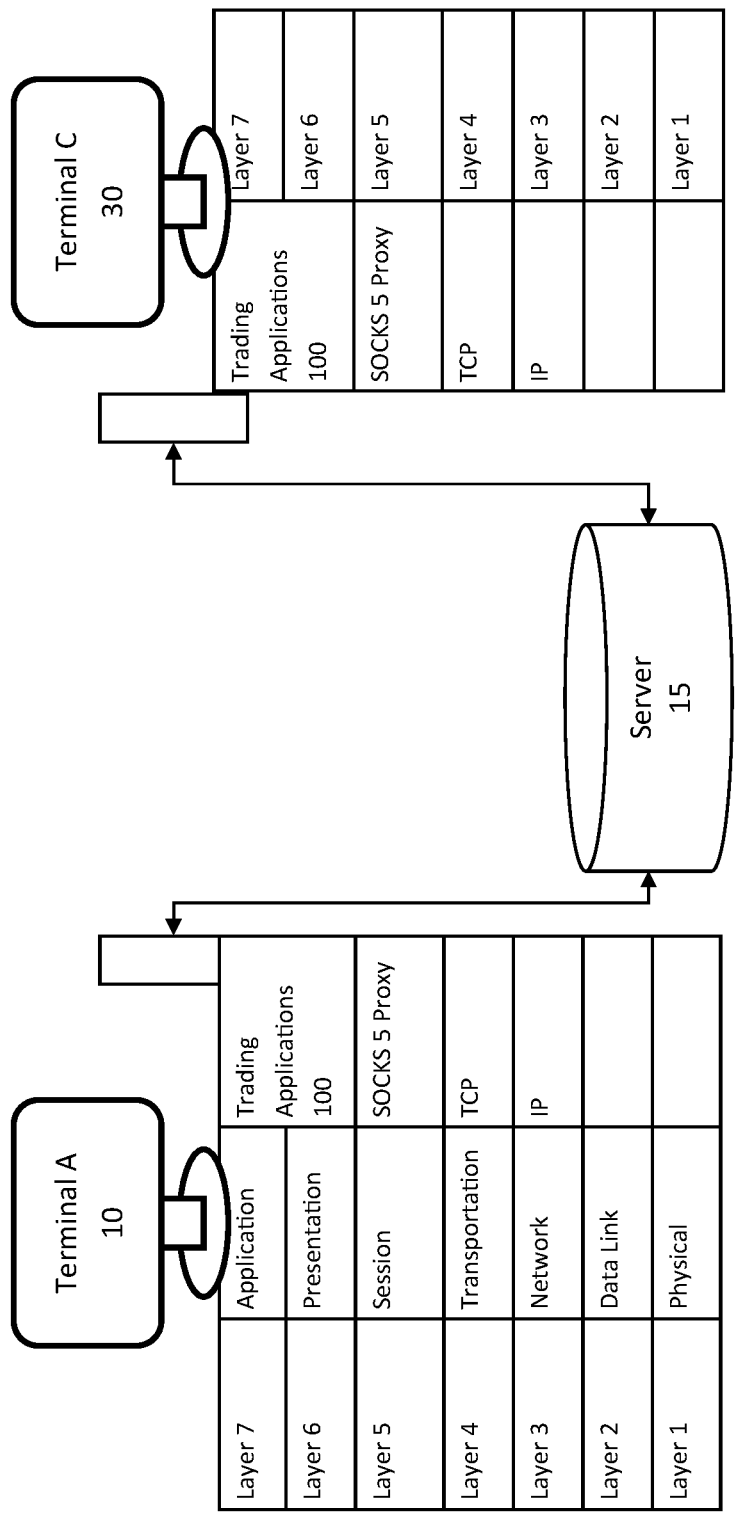
FIG. 6 depicts an OSI connectivity model.

FIG. 6 illustrates the preferred embodiment for the physical method for an OSI Connectivity Model. The OSI Model is displayed to show the transfer of information from an application running on Terminal A to a similar application on Terminal C. In this case, the information is bound down to the network Layer at Layer 3 then connected through a server via a SOCKS5 Proxy then passed on to Terminal C.

Figure 7:
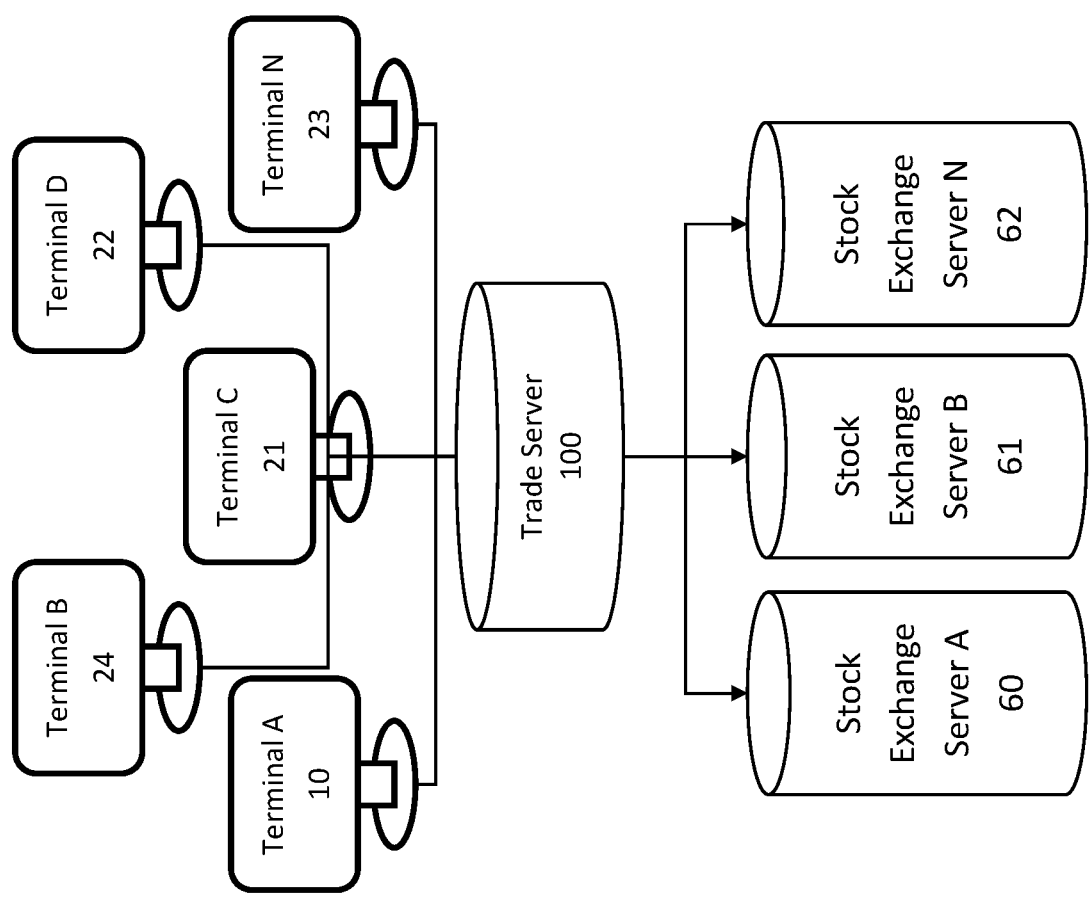
FIG. 7 depicts a traditional stock market exchange connection model.

FIG. 7 illustrates the preferred embodiment for the physical method of a traditional stock exchange connection model. In the traditional stock exchange model, a company consists of a plurality of Terminals each connected to a Trade Server. The trade serverconnects to each of the Stock Exchange Servers.

Figure 8:
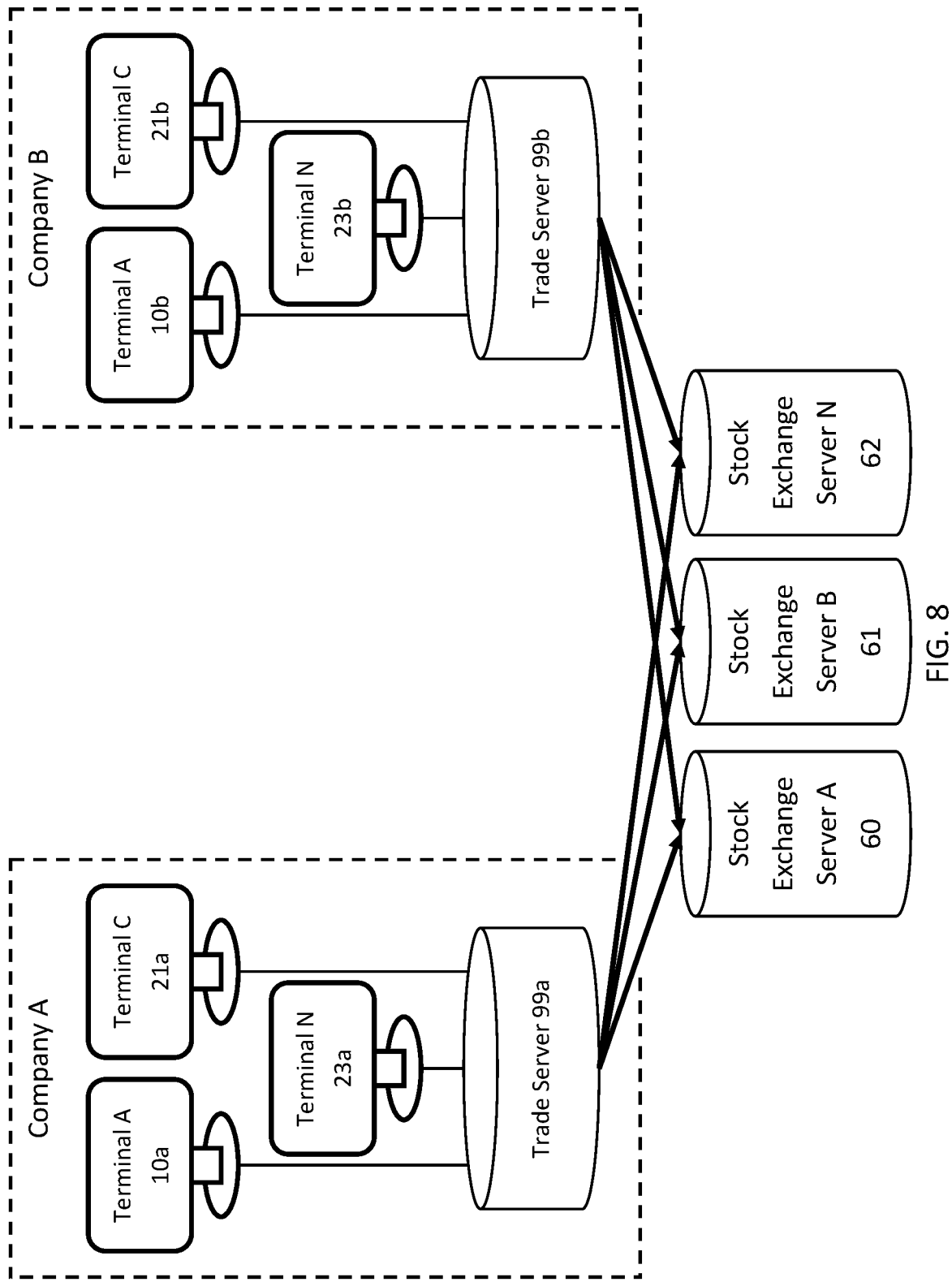
FIG. 8 depicts two companies connected to similar servers.

FIG. 8 illustrates the preferred embodiment for the physical method of a traditional stock exchange connection model with at least two companies connected to the various exchanges.

Figure 9:
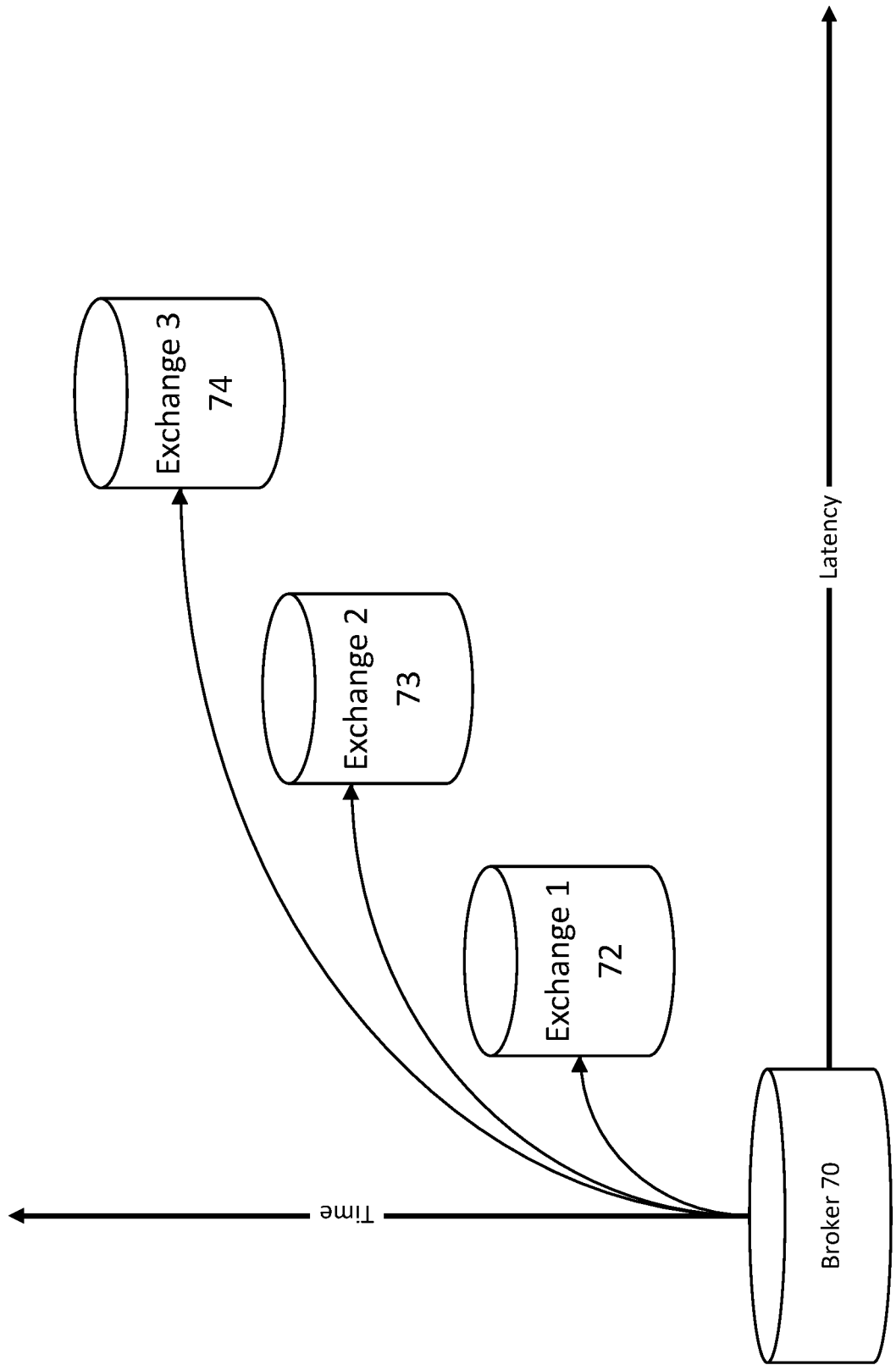
FIG. 9 depicts a single firm trade timing diagram.

FIG. 9 illustrates the preferred embodiment for the physical method for the timing of a trade originating from a single source, and being delivered to a plurality of sources. When a trade server sends out an order for stocks, currently they are all sent at the same time. But because of latency issues they reach the different exchanges at different times. This causes issues when executing orders that exceed the volume held in at least one exchange. The speed of the transaction is almost entirely dependent on the location of the Broker/Dealer in reference to the exchange.

Figure 10:
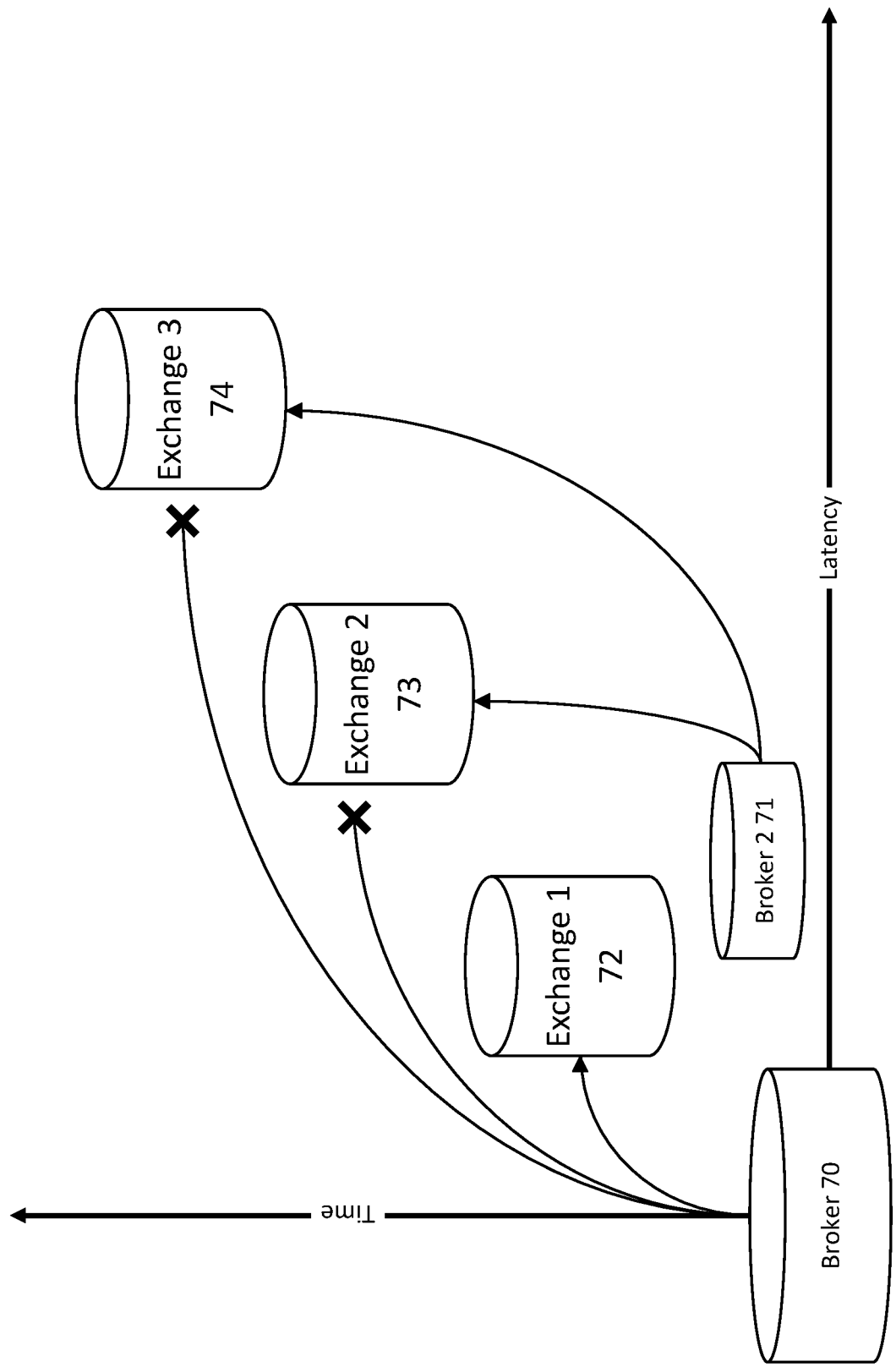
FIG. 10 depicts a front running timing diagram.

FIG. 10 illustrates the preferred embodiment for the physical method of an example of front running. Front running is the unethical practice of a broker trading an equity in his personal account based on advanced knowledge of pending orders from the brokerage firm or from clients, allowing him to profit from the knowledge. It can also occur when a broker buys shares in his personal account ahead of a strong buy recommendation that the brokerage firm is going to make to its clients. Front running is possible because one broker may be closer to a certain exchange and can then race their order in front of another order (the original order) to pull their shares, replacing them at a higher price or buy the shares and replace them at a higher price.

Figure 11:
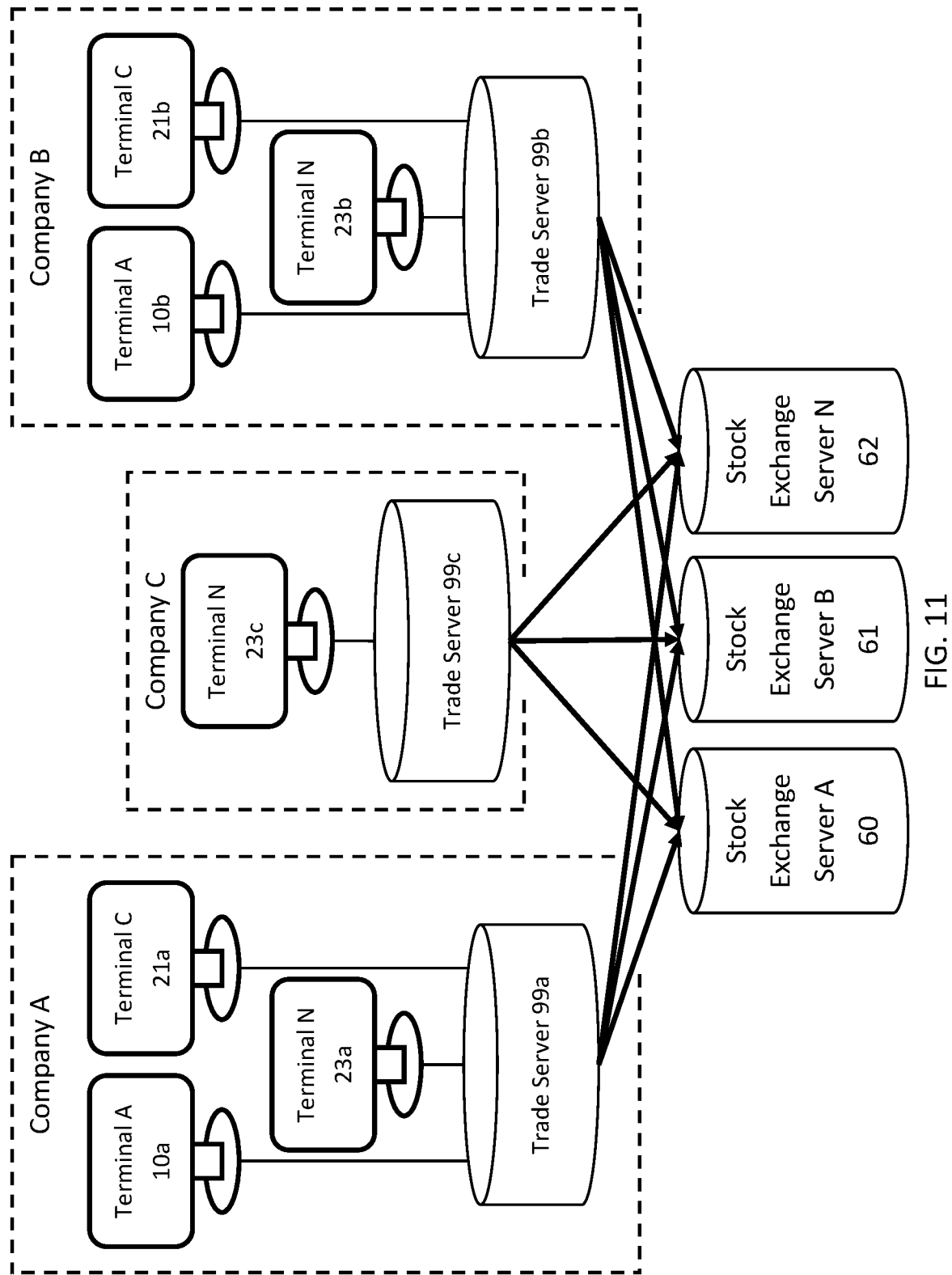
FIG. 11 depicts three companies connecting to stock exchange servers.

FIG. 11 illustrates the preferred embodiment for the physical method of at least three companies connecting to a plurality of stock exchange servers.

Figure 12:
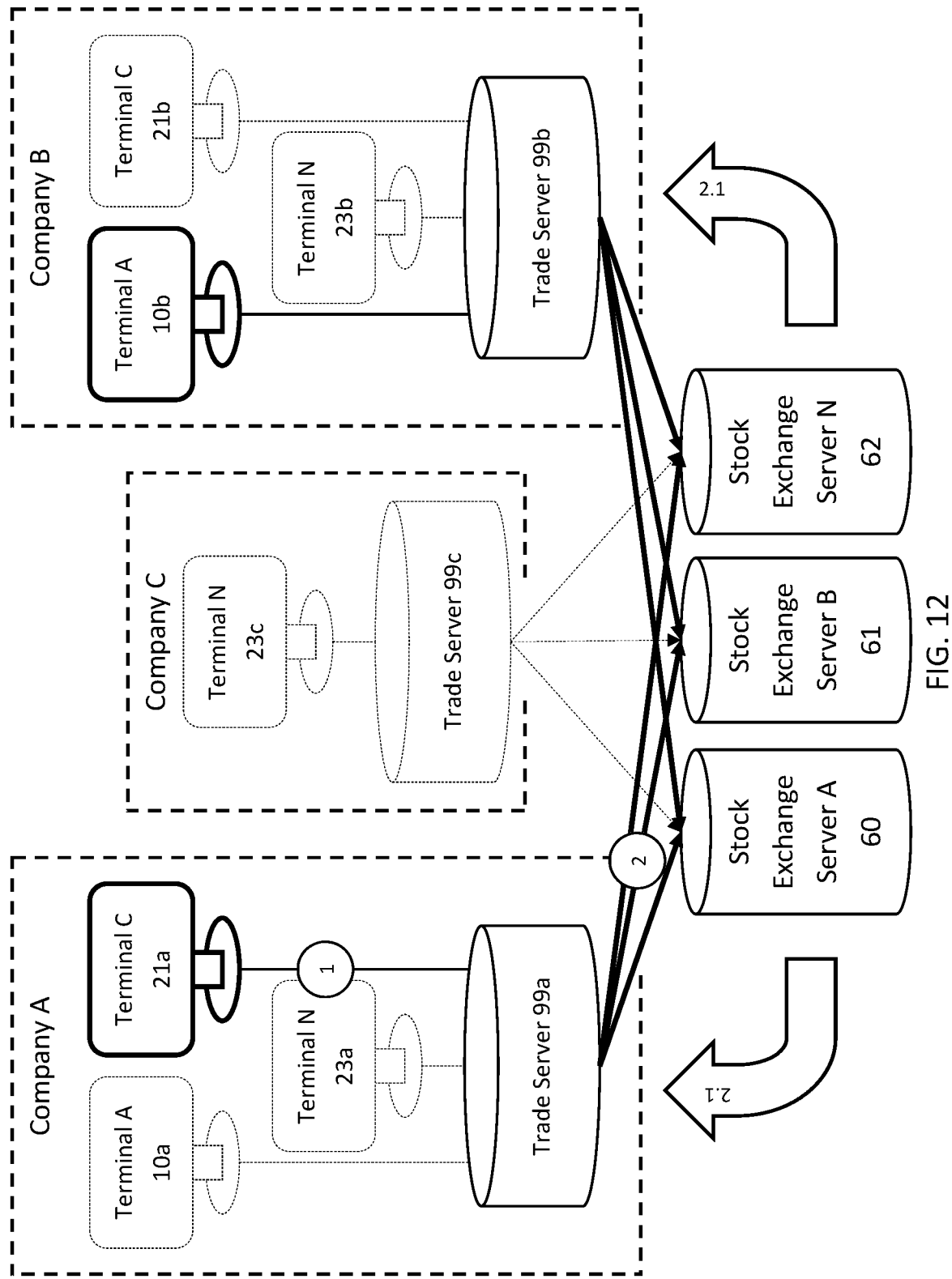
FIG. 12 depicts a traditional trade.

FIG. 12 illustrates the preferred embodiment for the physical method of a traditional trade between two companies. This diagram shows a hypothetical order where Company B has posted 100 shares at $1.00/share, across three exchanges. Company A wishes to purchase these shares. At time 0, Company B posts the shares on the three stock exchanges with volumes of 20, 30, and 50, respectively. At time 1, the trader operating the terminal at company A puts in the order for 100 shares for $100. At time 2, the trade server looks to the exchanges to check their volumes and all at one time blasts out an order for the shares, eventually matching the volume necessary to complete the order. At time 2.1, the trade is complete and Company A receives the shares, Company B is compensated for the sale of securities.

Figure 13:
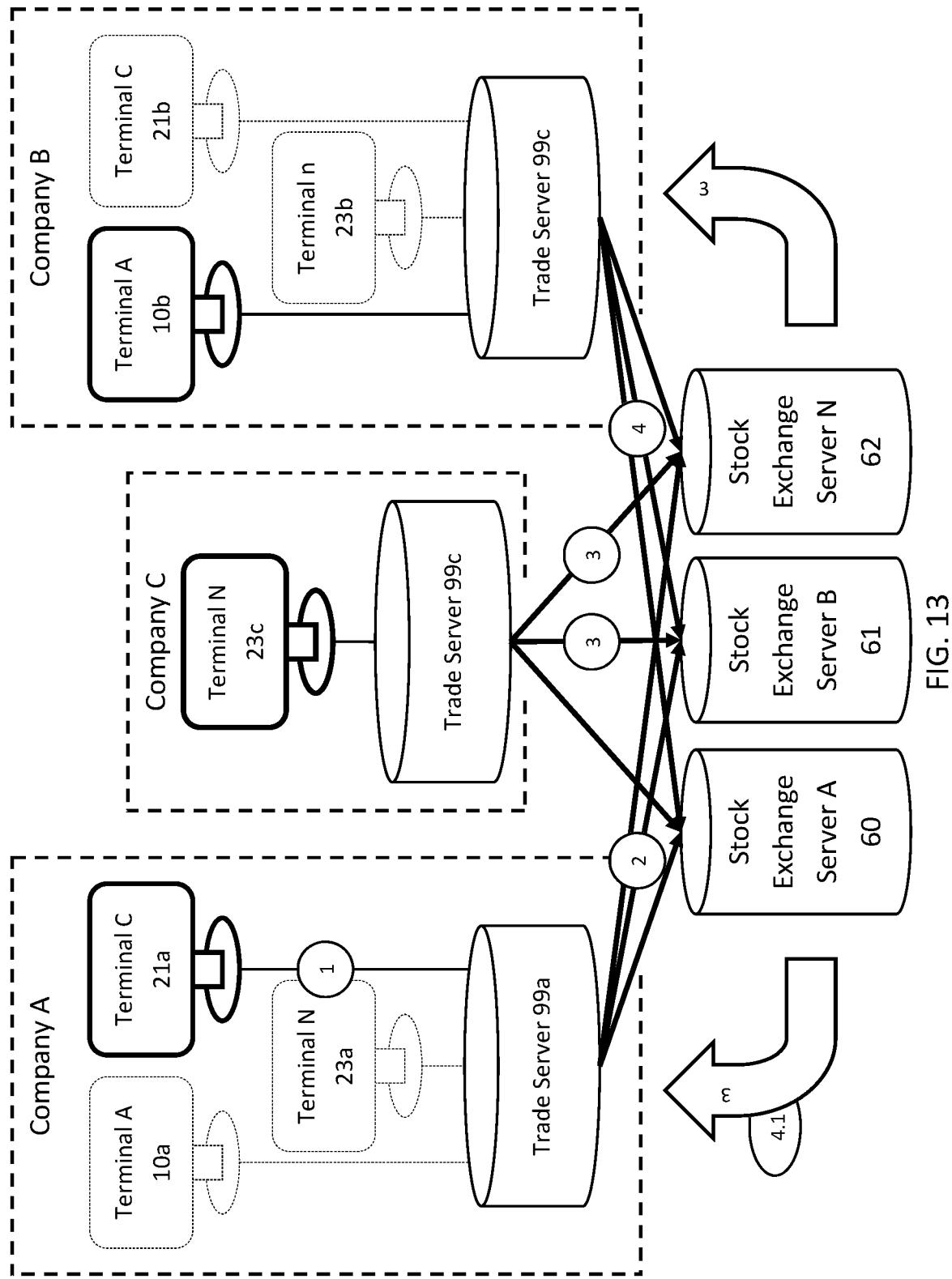
FIG. 13 depicts a front running trade.

FIG. 13 illustrates the preferred embodiment for the physical method of an example of front running using the model presented in FIG. 12. This diagram shows a hypothetical order where Company B has posted 100 shares at $1.00/share across three exchanges. Company A wishes to purchase these shares. At Time 0, Company B posts the shares on the three stock exchanges with volumes of 20, 30, and 50, respectively. At time 1, the trader operating the terminal at company A puts in the order for 100 shares for $100. At time 2, the trade server looks to the exchanges to check their volumes and all at one time blasts out an order for the shares, eventually matching the volume necessary to complete the order. At time 3, Company C engages in front running by seeing Company A's order to the first stock exchange which has a volume of 20 shares, then goes to the other two exchanges to buy the other shares before Company A can reach them. Company B receives the money from all of the shares, Company A gets the 20 shares executed at a price of $20.00. Company C then places the shares of the other two exchanges back on the market at $1.01 a share. At time 4, Company A's algorithm allows the trade to be continued even with the higher price. At time 4.1, Company A receives the other 80 shares at $80.80 and company C receives a profit of $0.80 on the trade FIG. 14 illustrates the preferred embodiment for the physical method of an example of the cryptocurrency, Bitcoin's, blockchain and its processes. Blockchain can be thought of as a publicly distributed ledger for transactions between two parties. When a transaction was made between two parties, the block in the ledger would be updated when two or more entities not involved in the transaction authenticate the trade. Once the trade is authenticated, the object (currency, stock, precious metals, etc.) changes ownership. This negates the need for a physical transferable object. It becomes virtually impossible to cheat the system as everyone has access to the public ledger. The cryptocurrency, Bitcoin, implemented a blockchain as a way of securing transactions while keeping the two agents of the trade anonymous. The publicity of the ledger (a representation of which can be found at blockchain.info) offers an extra level of security for the cryptocurrency as anyone can view and check the ledger for inconsistencies. Step 1 involves four parties in the trade (A, B, C, and D)) the public Ledger (blockchain) would include blocks of previous trades. The lines represent the possible connections between the four agents of trade. Step 2 shows the transaction between A and D, where D is the seller and A is the buyer. A becomes the new owner of the bitcoin, and D receives compensation from A, Normally for the bitcoin ledger, it will not show the monetary transaction, but for sake of example it is included to show a wider variance in possibilities. The transaction creates a block in the blockchain. The transaction is not effective until the ledger is verified by at least one other party not included in the transaction. Step 3 represents, the ledger held by both agents A and D being sent out to their neighbors, B and C. The two ledgers must match for the bitcoin to change assignment. Finally, once the transaction is verified the ledger is updated to show an authenticated trade and the bitcoin is assigned to its new owner. The average time for the authentication is around 8 to 10 minutes (Step 4). There is no physical representation of the Bitcoin cryptocurrency, each bitcoin is issued at 64-bit address. Each agent of trade is also issued a 64-bit address that is referred to as their "wallet". When a bitcoin is transacted the ledger changes the association of the bitcoin address to the new owner's wallet address to complete the transaction. Before this assignment takes place, the ledger is referenced to ensure that the current owner of the bitcoin has complete ownership. This authentication is done through blocks of servers referred to as miners. "Miners" or parties who run servers to authenticate the transaction are compensated in bitcoin for every 210,000 blocks of transactions that they authenticate. The miners are given a program that automatically finds blocks to authenticate and updates the ledger for every transaction. By having the ledger be distributed between pluralities of users, it secures the transactions by making cheating the system virtually impossible. If the transaction ledgers do not match up then the transaction is voided and not completed. Whenever a trade is initialized the program distributed to the miners queries the distributed ledger searching for the path of bitcoin, to ensure the initial owners are the true owners of the coin. If everything checks out the transaction continues following the steps listed above.

Figure 15:
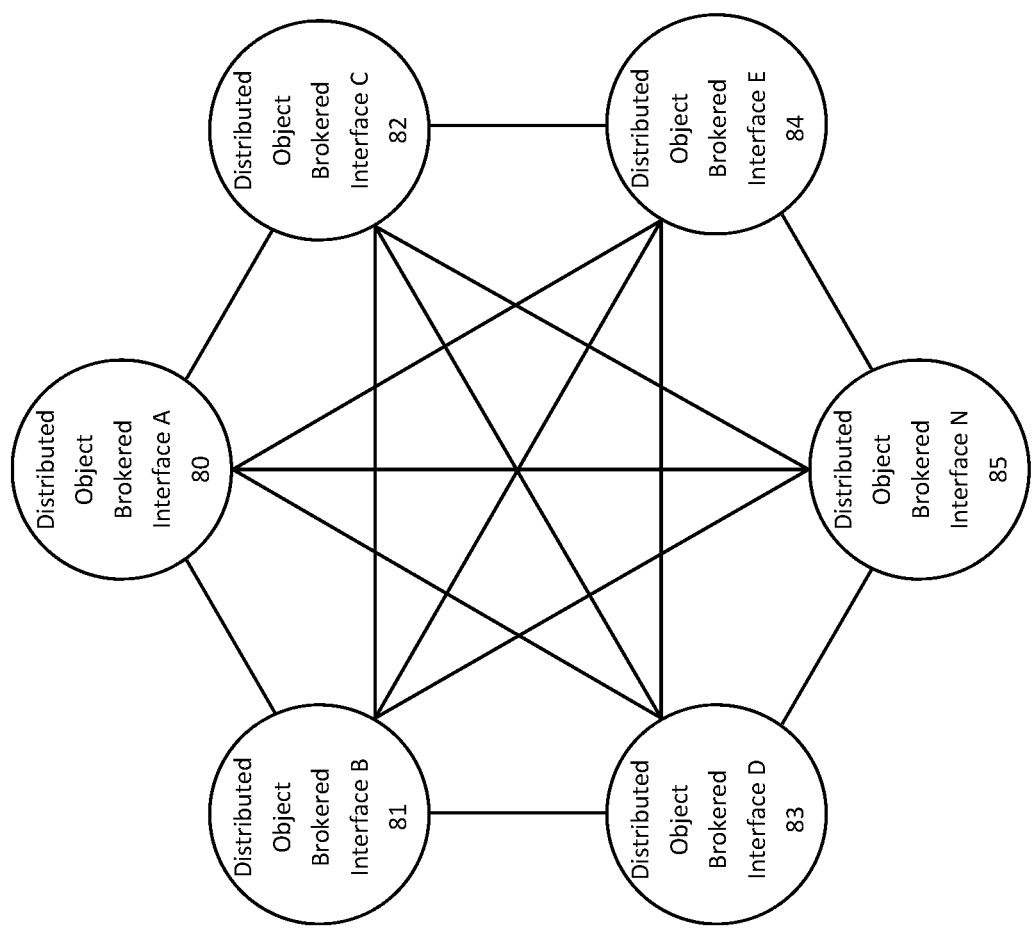
FIG. 15 depicts a simple Distributed Object Brokered Interface.

FIG. 15 illustrates the preferred embodiment for the physical method of a simple diagram representing the Distributed Object Brokered Interface. In distributed computing, an object request broker (ORB) is a middleware which allows program calls to be made from one computer to another via a computer network, providing location transparency through remote procedure calls. ORBs promote interoperability of distributed object systems, enabling such systems to be built by piecing together objects from different vendors, while different parts communicate with each other via the ORB. Each aspect within the distribution can directly connect to another, without the need for a middle man to transact the communication.

Figure 16:
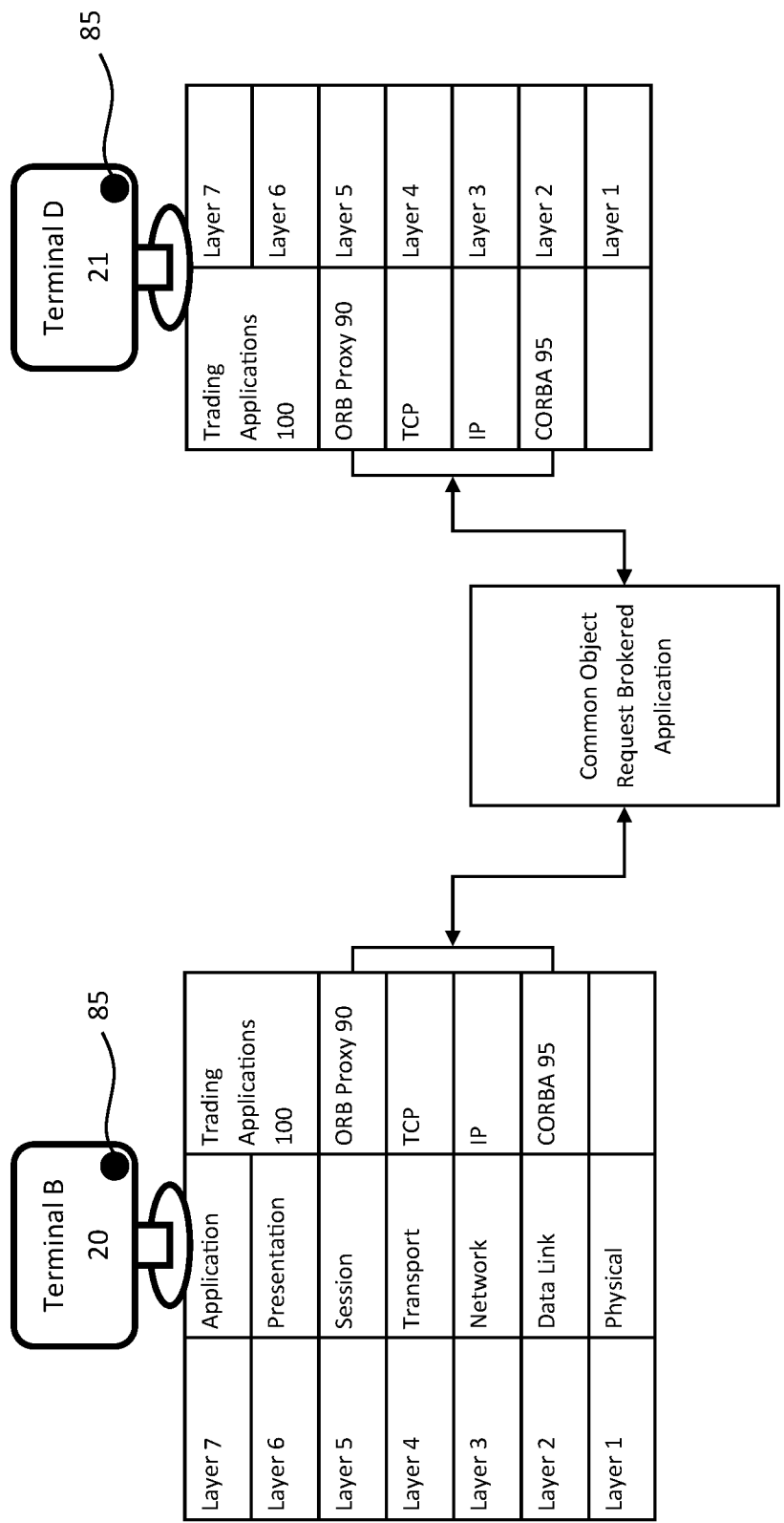
FIG. 16 depicts an OSI Model with ORB proxy.

FIG. 16 illustrates the preferred embodiment for the physical method of the application of the OSI Model with an ORB Proxy. Within the expanded OSI model, the interconnectivity of two terminals happens by binding down the communication to the DATA Link which operates within CORBA and a Layer 5 ORB Proxy. The Common Object Request Broker Architecture (CORBA) is a standard defined by the Object Management Group (OMG) designed to facilitate the communication of systems that are deployed on diverse platforms. CORBA enables collaboration between systems on different operating systems, programming languages, and computing hardware. CORBA uses an object-oriented model although the systems that use CORBA do not have to be object-oriented. CORBA is an example of the distributed object paradigm.

Figure 17:
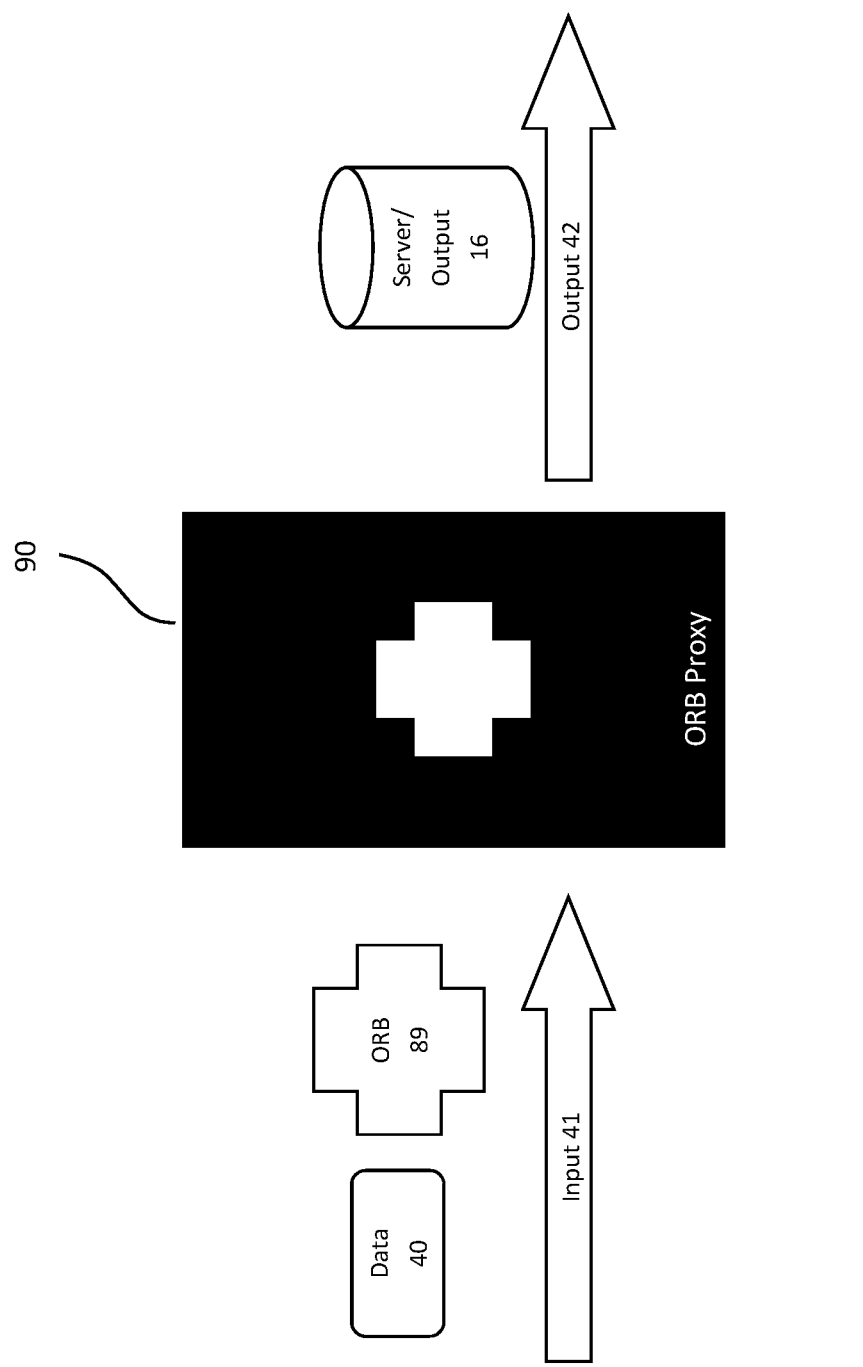
FIG. 17 depicts an ORB proxy.

FIG. 17 illustrates the preferred embodiment for the physical method representing the ORB Proxy. If the client is behind a very restrictive firewall or transparent proxy server environment that only allows HTTP connections to the outside through port 80, communication may be impossible, unless the proxy server in question allows the HTTP CONNECT method or SOCKS connections as well. At one time, it was difficult even to force implementations to use a single standard port—they tended to pick multiple random ports instead. As of today, current ORBs do have these deficiencies. Due to such difficulties, some users have made increasing use of web services instead of CORBA. These communicate using XML/SOAP via port 80, which is normally left open or filtered through a HTTP proxy inside the organization, for web browsing via HTTP. Recent CORBA implementations, though, support SSL and can be easily configured to work on a single port. Some ORBS, such as TAO, omniORB and JacORB also support bidirectional GIOP, which gives CORBA the advantage of being able to use callback communication rather than the polling approach characteristic of web service implementations. Also, most modern firewalls support GIOP & HOP and are thus CORBA-friendly firewalls.

Figure 18:
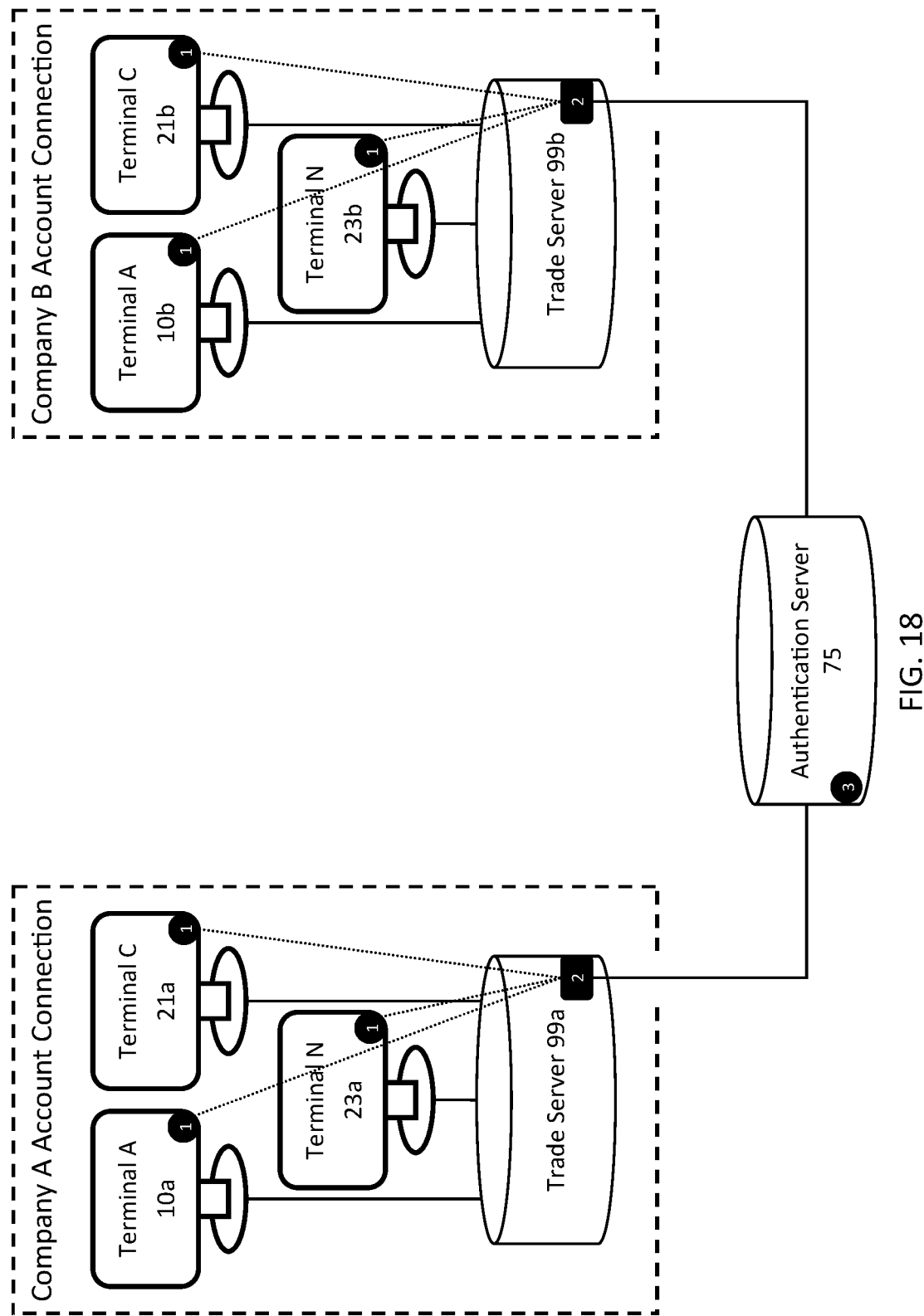
FIG. 18 depicts a representation of differentiation in code between distributed objects by type.

FIG. 18 is a representation of the differentiation of code between distributed objects. Each company within the new proposed system will have a plurality of terminals connected to a trade server. The terminals will have a distributed object brokered interface that is a specific code set to the terminals. Only the terminals within a company will be able to talk to that company's trade server. The trade server of each company will have a distributed object brokered interface that is nested within a specific router, allowing the server to connect to the information exchange. It protects the interface by not exposing the source code in any way to the trade server. The authentication server also has a distributed object brokered interface which can authenticate any transactions that occur between two trading servers through the routers. The routers and the authentication server also have specific code blocks representative of their specific use within the system. The distributed object within the system can only be communicated to by the specific router, and that router can only accept information from other routers or the authentication server.

Figure 19:
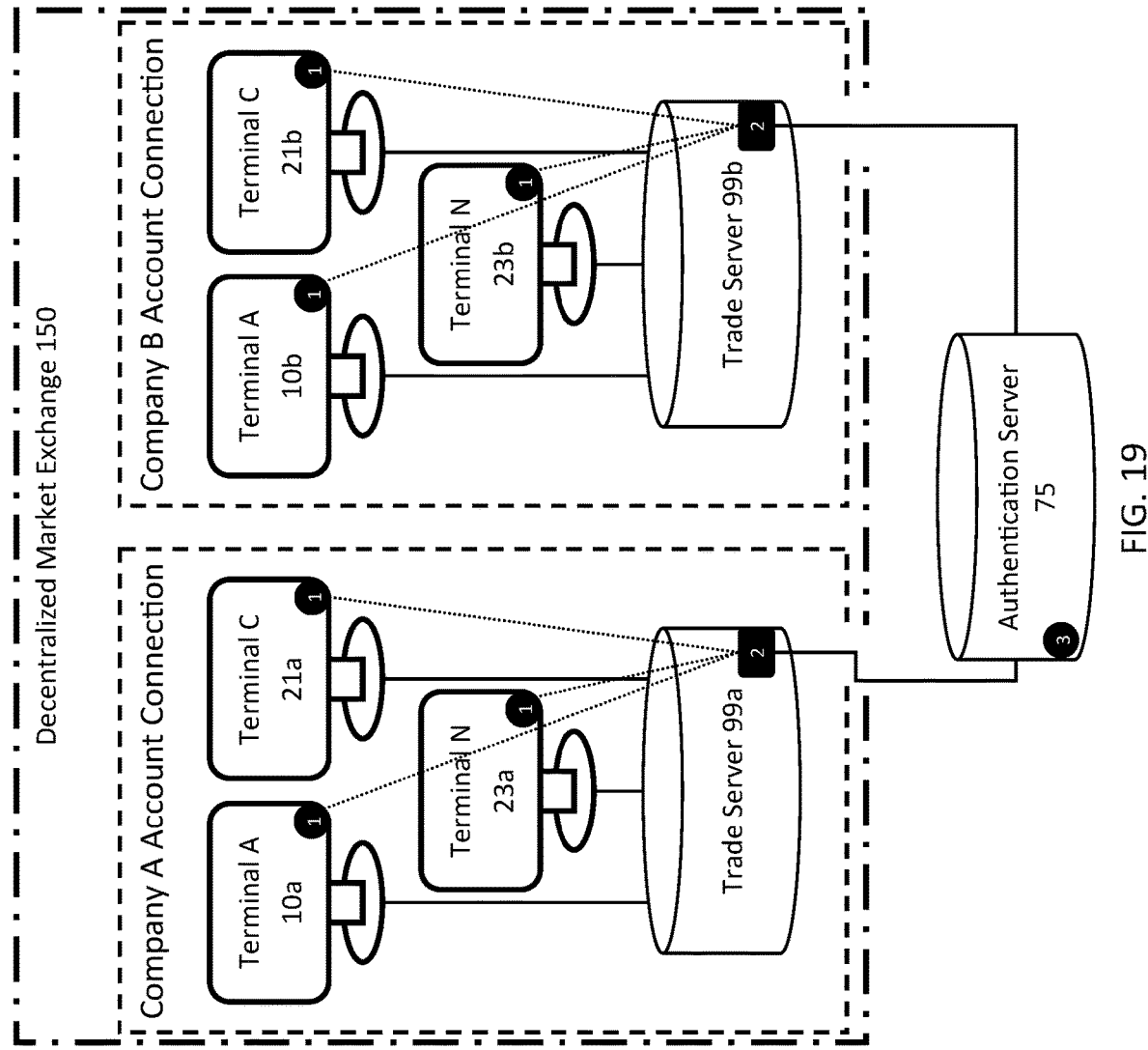
FIG. 19 depicts a decentralized market exchange diagram.

FIG. 19 illustrates the preferred embodiment for the physical method of a Decentralized Market Exchange. This diagram represents the model of how an exchange would function. The actual exchange consists of a plurality of companies that are interconnected through the routers that are nested within their trading servers. The company specific terminals have access to market information that is supplied through the routers specifically. These peer to peer transactions only need a centralized authentication server to ensure the fairness of all of the trades that pass within the "cloud-based" exchange. In theory, the Authentication Server is not directly part of the exchange but acts as a storage mechanism to facilitate the audit trail of the transactions.

Figure 20:
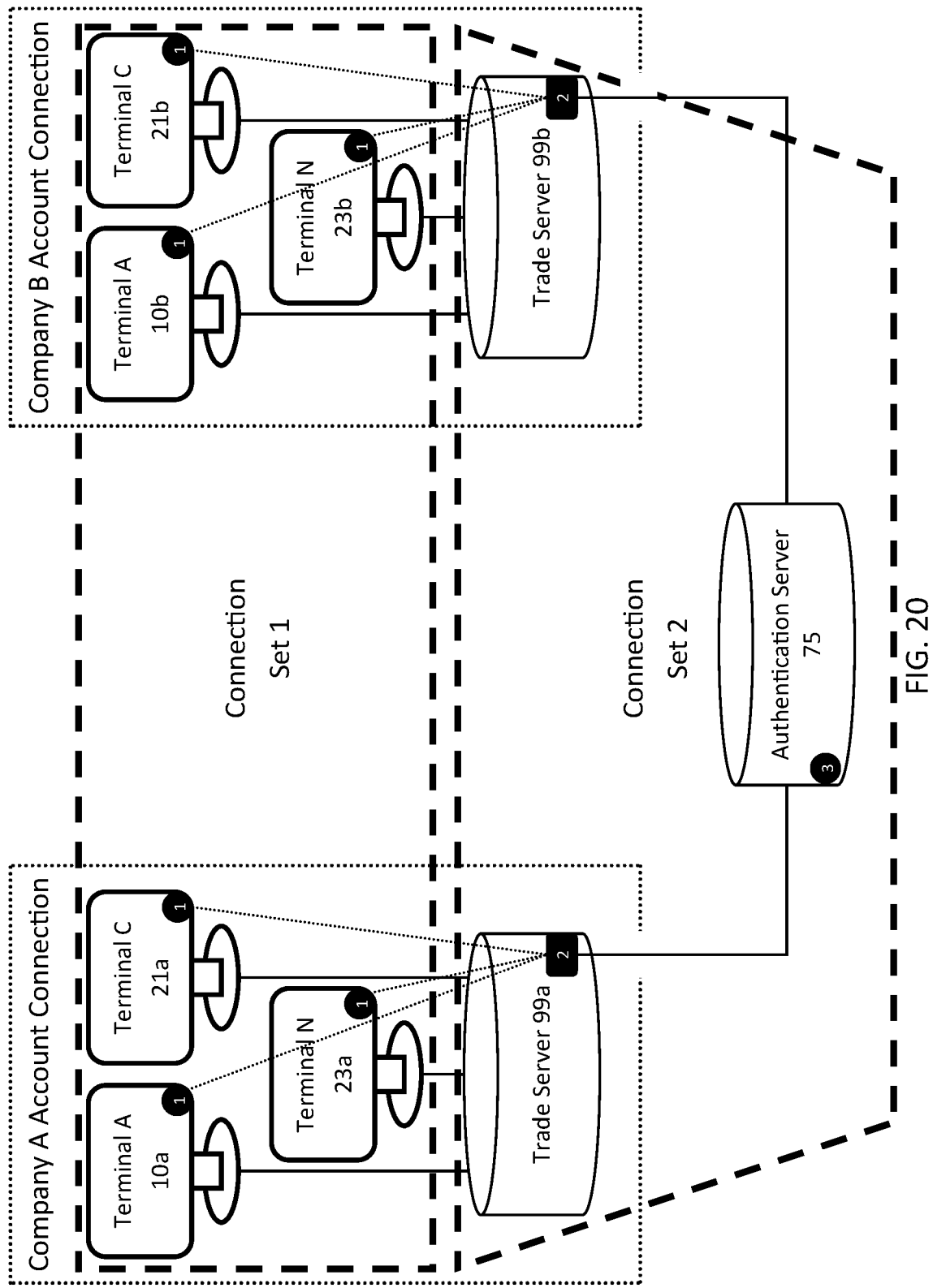
FIG. 20 depicts connection sets amongst items in the decentralized market exchange diagram.

FIG. 20 illustrates the preferred embodiment for the physical method of the connection sets between members of the distributed network. Connection set 1—the interconnection between the terminals of various companies allows for a speedier information transfer from their company specific routers when facilitating trades. If a trade is facilitated then it passes to connection set 2. Connection set 2—this connection shows the distribution of the exchange where the transfer happens between the two routers, but is authorized by the external Authentication Server.

Figure 21:
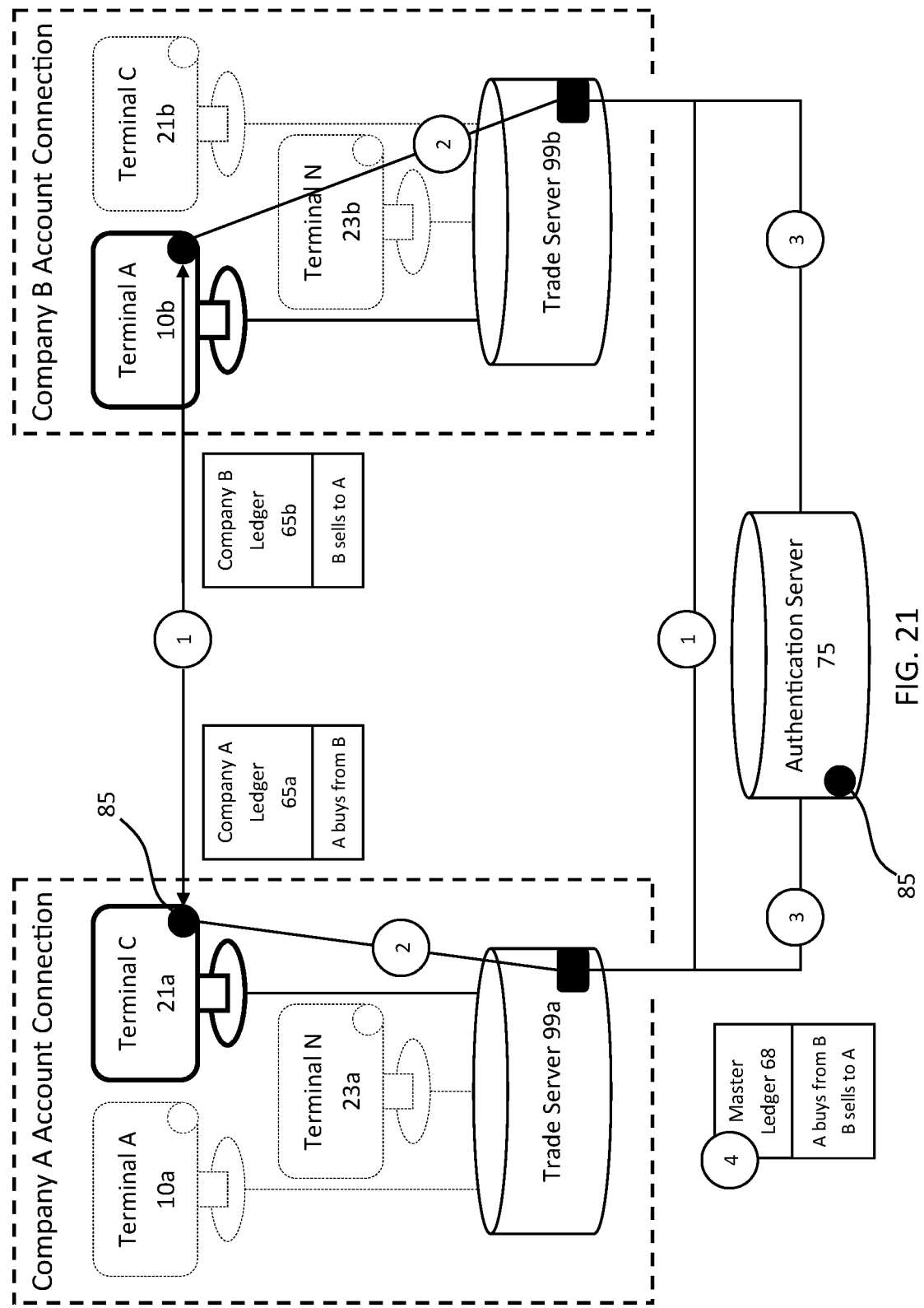
FIG. 21 depicts the ledger distribution after trade.

FIG. 21 illustrates the preferred embodiment for the physical method of the ledger distribution following a trade in the decentralized system. This represents a transaction between Company A and Company B following the ledger. At time 1, a trade is initiated between a Terminal at Company A and a terminal at Company B. The routers within the trade servers also execute the transaction at the time of the trade. At time 2, Company A's ledger represent A buying from B and Company B's ledger represents B selling to A. This information is passed from the distributed object within the terminal to the specific distributed object within a specific router. At time 3, the two ledgers are then passed down to the Authentication Server. At time 4 because the two ledgers match, the trade is authenticated and stored within the Master Ledger.

Figure 22:
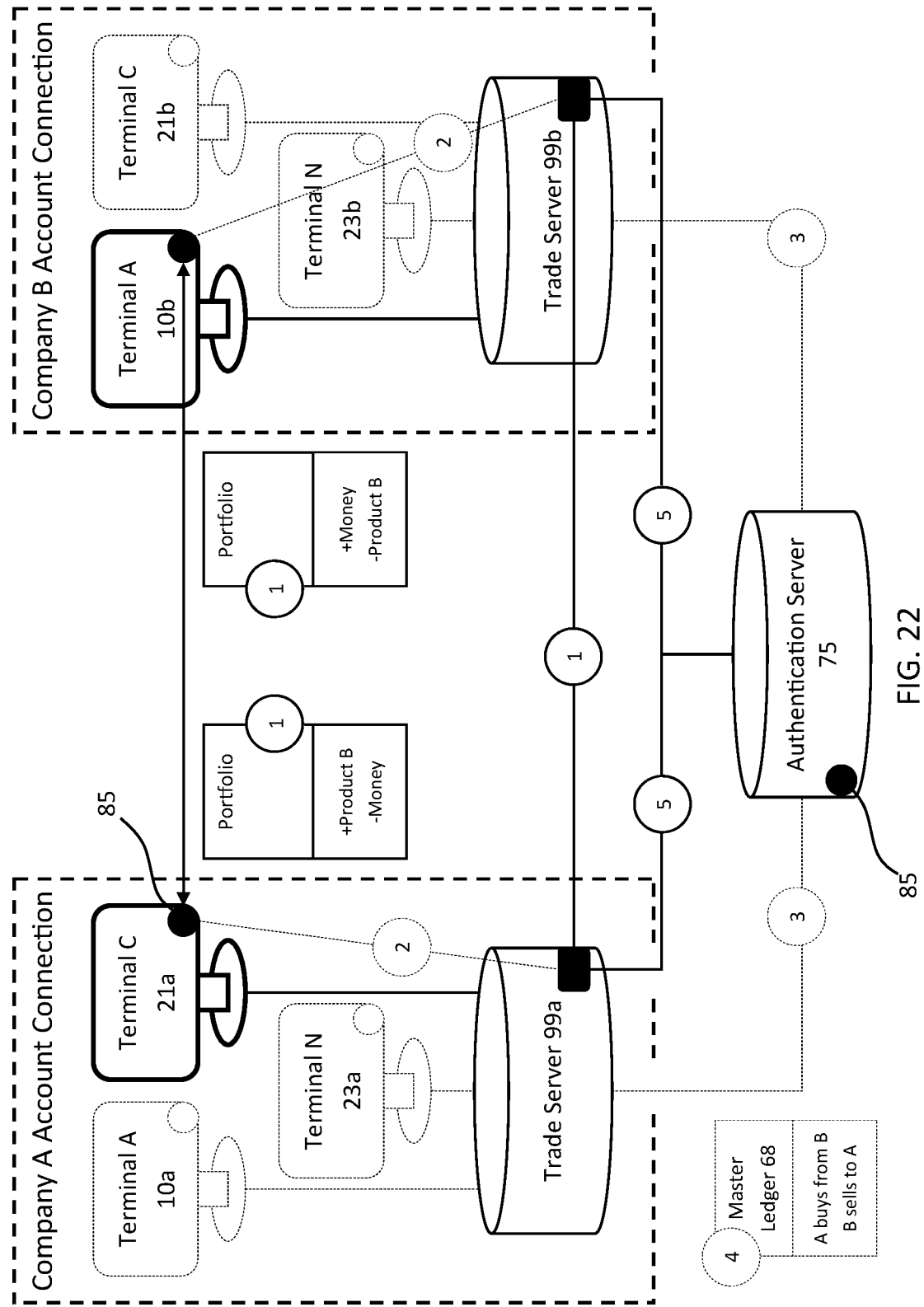
FIG. 22 depicts the portfolio distribution after trade.

FIG. 22 illustrates the preferred embodiment for the physical method of the portfolio distribution after a trade. This diagram follows the portfolio of a transaction between Company A and Company B. At time 1, once the trade has been initiated between the two terminals at Company A and Company B, their portfolio immediately changes to represent the transaction. Company A adds the product and loses the money. The opposite happens for Company B. At times 2-4 the similar ledger authentication steps occur as listed in FIG. 21. At step 5, the authentication server sends back a confirmation code to the Routers allowing those objects of the transaction to be traded again.

Figure 23:
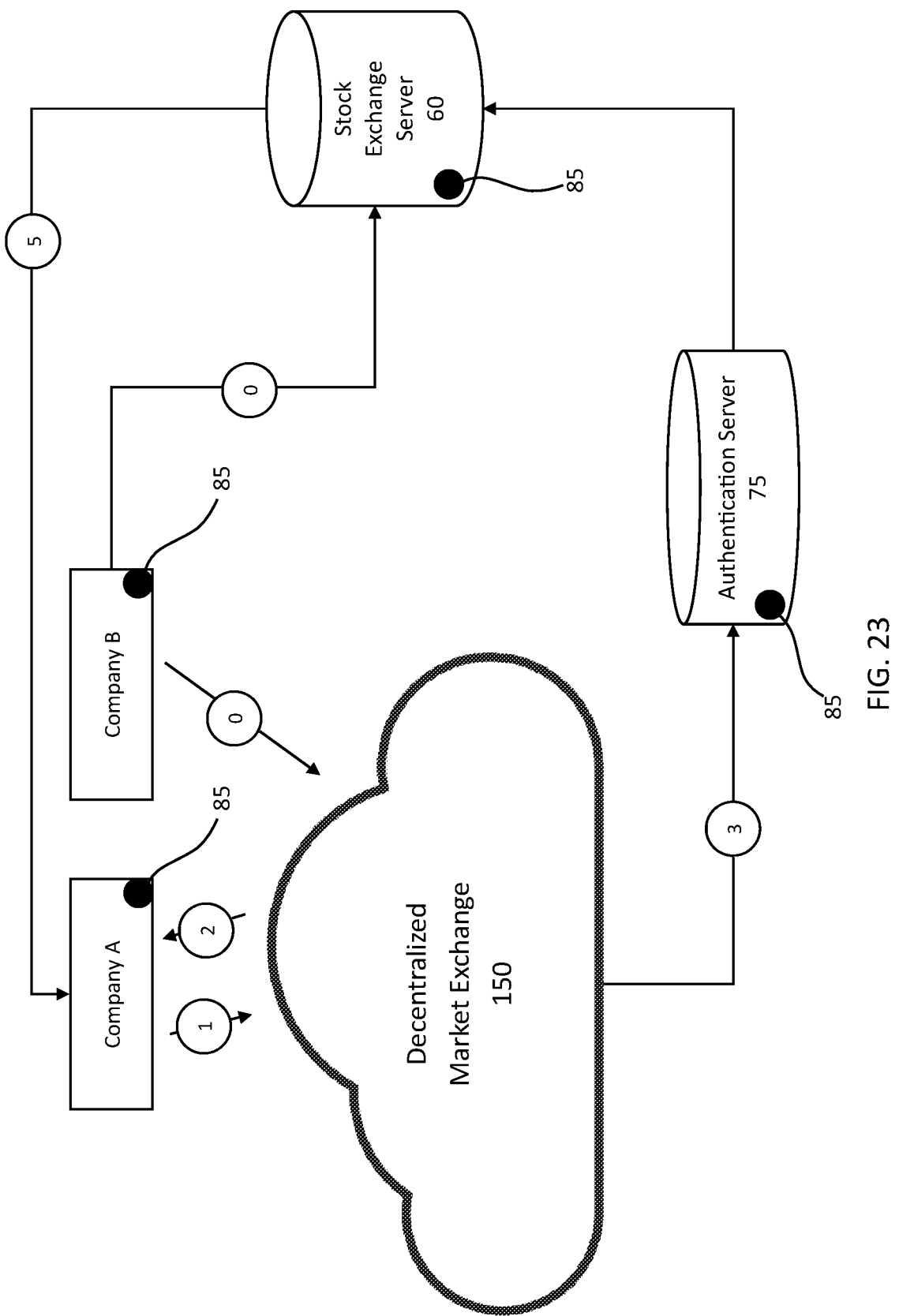
FIG. 23 depicts an example of matching full order volume when spread between decentralized and centralized exchanges.

FIG. 23 illustrates the preferred embodiment for the physical method for matching full order volume when volume is spread between Decentralized and Centralized Exchanges. Company A wants to buy 100 shares of Company B for $100 but the decentralized exchange cannot match the order volume. At time 0, Company B posts 50 shares of its stock to both the Decentralized Market Exchange and the Stock Exchange Server for a total of 100 shares at $100. At time 1, Company A posts a buy order for 100 shares at $100 dollars. This follows the diagrams in slides 21, 22. At time 2, only 50 of those shares are transacted as the portfolio changes, as that was the volume from the Decentralized market exchange. At time 3, when the ledger is sent from the routers within the company to the Authentication server, it becomes known that Company A still wishes to buy 50 more shares of Company B to complete their order. At time 4, the authentication server then acts on the behalf of Company A to see that the Stock Exchange Server with the distributed object brokered interface has the necessary volume to complete the trade. At time 5, the shares are assigned to company A.

Figure 24:
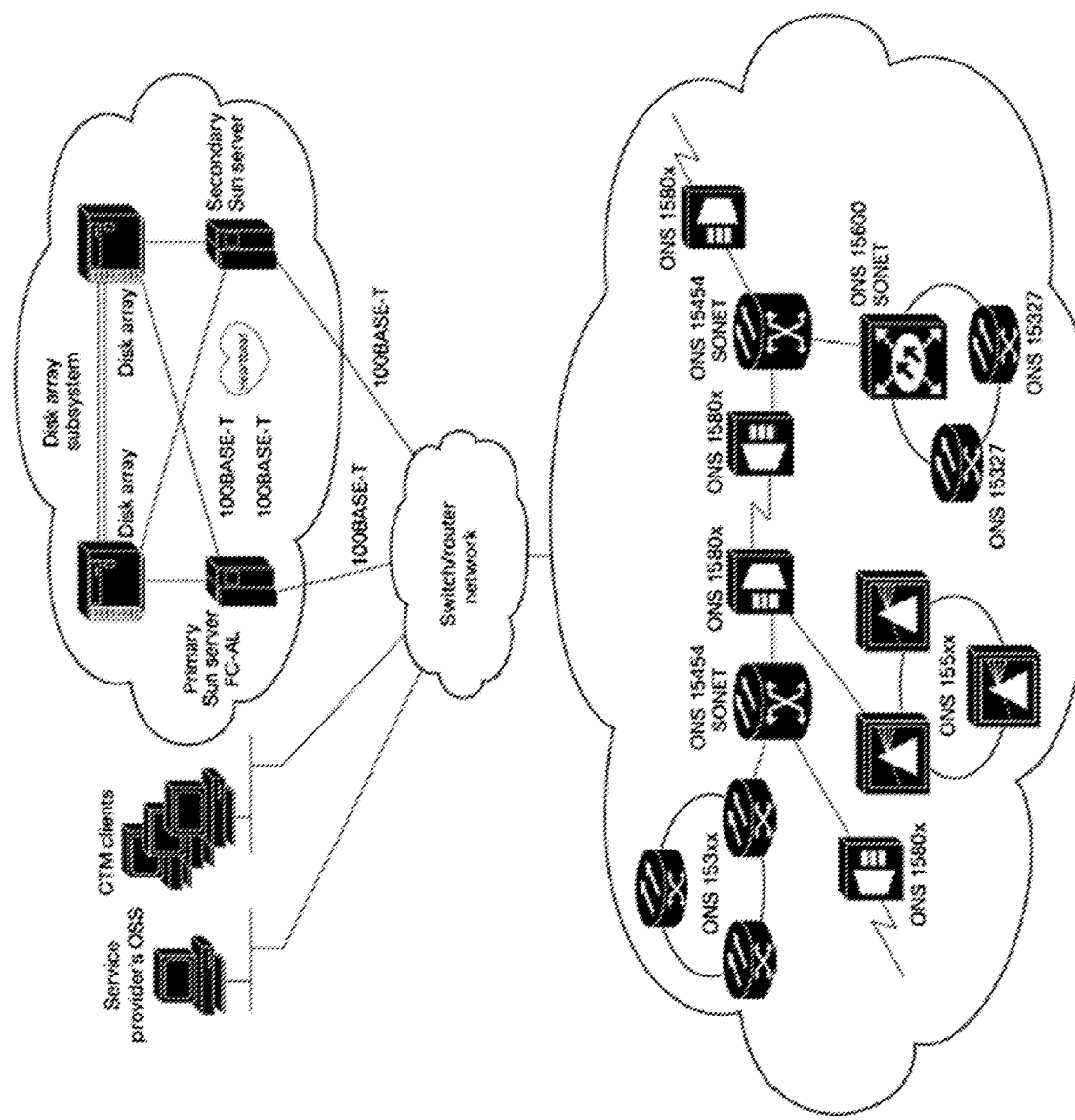
FIG. 24 depicts the distributed router network.

FIG. 24 provides an overview of Cisco Transport Manager in a geographically redundant high availability configuration with the cluster configuration connected to a switch or router network. Each location consists of a one- or two-node Cisco Transport Manager local redundancy configuration (a two-node configuration is shown).

Figure 25:
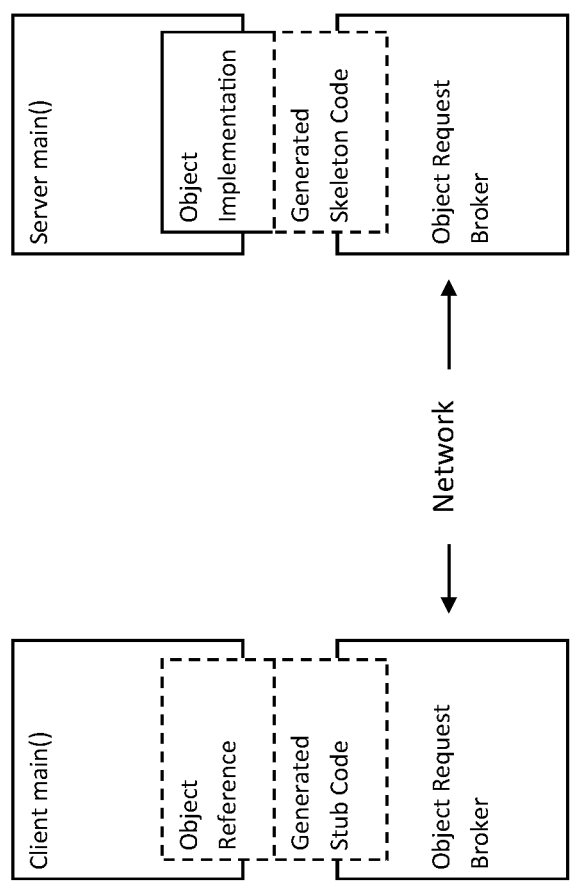
FIG. 25 depicts common object request brokered architectures.

FIG. 25 illustrates the high-level paradigm for remote inter-process communications using CORBA. The CORBA specification further addresses data typing, exceptions, network protocols, communication timeouts, etc. For example: Normally the server side has the Portable Object Adapter (POA) that redirect calls either to the local servants or (to balance the load) to the other servers. The CORBA specification (and thus this figure) leaves various aspects of distributed system to the application to define including object lifetimes (although reference counting semantics are available to applications), redundancy/fail-over, memory management, dynamic load balancing, and application-oriented models such as the separation between display/data/control semantics (e.g. see Model-view-controller), etc. In addition to providing users with a language and a platform-neutral remote procedure call (RPC) specification, CORBA defines commonly needed services such as transactions and security, events, time, and other domain-specific interface models.

Figure 26:
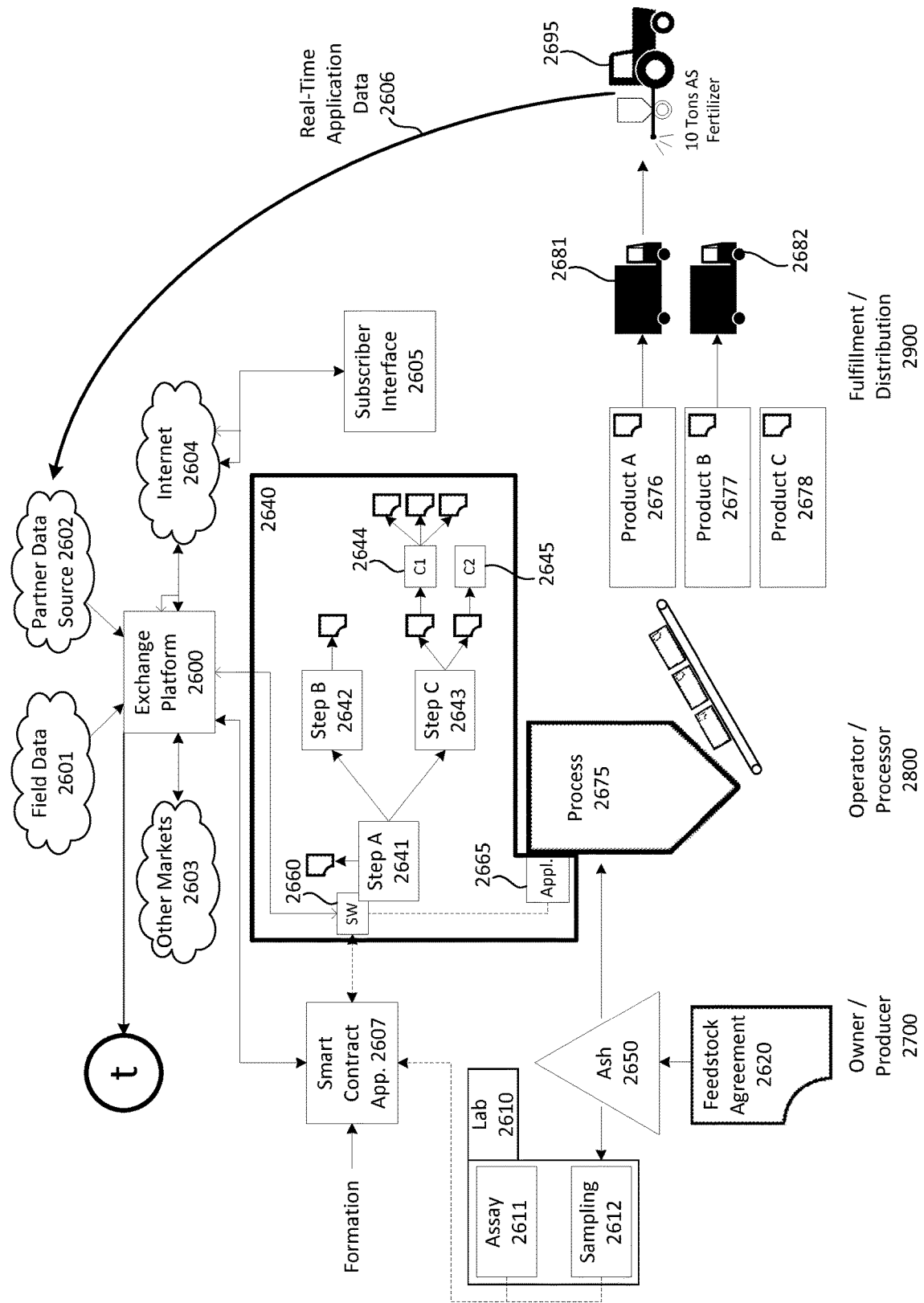
FIG. 26 depicts an overview of the system of systems.

FIG. 26 depicts an overview of the system, method, process, and utility associated with the liquidation of fly ash. 2700 represents the coal burning power plant industry, regardless of whether or not they are producing energy that is used, produce a byproduct known as fly ash. Normally considered a waste product, fly ash is not only costly to transport but costly to store due to environmental regulation. These producers of fly ash may sell or willingly distribute the waste to other potential owners who may store the product.

The unique process developed by the applicants, can extract a plurality of rare earth metals and other valuable mineral products. These rare earth metals and other products can be commoditized and sold on exchanges for liquidation. Producers and owners of stockpiled fly ash may engage in a "feedstock agreement" 2620 encompassing the producers/owners commitment to subscribe to the exchange 2600 allowing release of feedstock for subsequent processing and sale of products. A subscription allows the subscriber to move fly ash from their storage facilities to process 2675 for producing a portfolio of valuable mineral products, including but not limited to rare earth metals, fertilizer, and various industrial chemicals. This subscription begins the process of eventual liquidation.

After the subscription agreement 2620 is established between registrant and an owner or producer of fly ash, the fly ash may be stockpiled 2650 at either the registrant's facility or left in place at the owners site for eventual extraction. Each individual shipment, or allotment of fly ash can be logged into a distributed ledger 2650. A hash code 2660 may represent a specific shipment/allotment and may track the shipment through the procurement process.

In order to quantify the composition of individual shipments/allotments stored within 2650, each shipment/allotment may be randomly sampled and analyzed. The resulting analysis is an inventory of the minerals and metals found within the fly ash. The ledger holding the hash code representing an individual shipment/allotment may be amended to include a relative composition. A random sample 2612 of fly ash is sent to a lab 2610 for analysis to determine the shipment's/allotment's value in the form of an assay 2611. The assay results may be correlated to the spot rate of the commodities contained therein.

The processes 2675 may be predicated on the use of one or more Smart Contracts. Smart Contracts are computer protocols intended to facilitate, verify, or enforce the negotiation or performance of a contract. Many contractual clauses may be made partially or fully self-executing, self-enforcing, or both. The aim with smart contracts is to provide security and traceability that is superior to traditional contract law and to reduce other transaction costs associated with contracting.

Smart contracts have been used primarily in association with cryptocurrencies. The most prominent smart contract implementation is the Ethereum blockchain platform. Once the composition of the fly ash is determined, a smart contract system 2607 logs the value of the commodities based on the spot rate of the commodity composed therein. The smart contract architecture can also incorporate specific contract direction that a subscriber may dictate as part of an order.

This spot rate is used to price the shipment of commodities associated with the fly ash. A value representing the shipment's specific value is amended to the shipment's hash code stored within the distributed ledger 2660.

The embodiment of the process of receiving an input of fly ash 2675 and outputting a tradeable commodity 2644, logged with a hash code; where the Hash code is the same as a hash function. A hash function is any function that can be used to map data of arbitrary size to data of fixed size. The values returned by a hash function are called hash values, hash codes, digests, or simply hashes. One use is a data structure called a hash table, widely used in computer software for rapid data lookup. Hash functions accelerate table or database lookup by detecting duplicated records in a large file.

The stockpiled fly ash 2650 is sent to the process stage 2675; the approaches and processes for extracting commodities from fly ash will be contained in the first CIP and co-pending application following this application and covered in much greater detail. An appliance 2665 is collocated with the process control system of 2675 in order to control and manage the global supply chain of the fly ash through the chemical and physical processes of extraction, generally 2640 through 2676.

Further, 2665 facilitates the methods used to track the material for continue updating into the ledger within each stage to transactional change. The appliance adjusts the location value associated with the hash code 2660 representing a shipment of fly ash. The appliance also has the ability to label the outputs from the process as unique 2642, 2643, 2644, 2645. The entire supply chain is embodied therein. The supply chain is further defined as the process of process control, distribution of product, distribution of regents, and executing the chain of custody of the product.

2640 is the embodiment of the chemical and physical processes for the procurement of commodities and rare earth metals from fly ash. The processes contained within 2641, 2642, 2643, 2644, 2645, 2660 are the various steps within the process. Shipments of the fly ash are input into the system. Tracked by a hash code associated with 2660, the shipments move through the processes 2641, 2642, 2643 and are turned into commodities and rare earth metals. At the end of the processes, the commodities and rare earth metals produced are given unique hash codes 2644, 2645. The hash codes are used as representation of the items on the exchange platform 2600. The hash codes are amended to the ledger creating the tradeable commodity.

The first step in the process of converting a shipment of fly ash to commodities and rare earth metals is the extraction of one or more products. Each sub-stage contained within the process 2641 is controlled via a smart contract object 2660. The smart contract object 2660 is driven by data received from the smart contract appliance 2665, and the various data inputs from the exchange platform 2600 and provides various process control inputs associated with, but not limited to, the optimal pumping rate, stir rate, mixture ratios, amounts, and volume to maximize efficiency of processing system 2675.

Receiving the output from the first step in the procurement process 2641, a first option is to store the resulting products. Process intermediates may also be stockpiled for future use in process 2643.

Contaminants may be removed to create purified products which may be distributed to steps 2642 and 2643 improving the efficiency of extracting rare earth metals. The whole process is logged continuously by an appliance or appliances 2665 monitoring the supply chain.

In the event that the process intermediate is received by 2641 is not decided for storage 2642, the product will enter the procurement process. Through a proprietary chemical leaching solution, the product entered into this stage is transformed into rare earth metals. There are two outputs from this process: rare earth metals 2644 and an excess product 2645 that has the opportunity for future refinement but no immediate value. The excess product in 2646 will be moved to a similar storage facility as the product given to 2642.

Rare earth metals extracted from the chemical leaching solution 2643 are each assigned a new unique hash code. These hash codes are used to liquidize these commodities on a proprietary exchange 2600. The commodities created 2676, 2677, 2678 are shipped to their final destinations through the use of various supply chain fulfillment methods 2691, 2682. The excess product created is moved to a storage area 2642 with the potential for later refinement.

The smart contract application 2607 receives data from the exchange platform 2600 and acts as a guide for the exact specifications of production outlined in the embodiment included with the process control 2640, 2665. The smart contract application also creates tradeable derivatives that are based on the rare earth metal commodity outputs 2644 from the refinement process 2643.

In an embodiment of the proprietary exchange itself will operate and fluidly maintain a distributed network through a plurality of micro networks amongst its users. The micro networks will operate transactions within a small number of users. This increases the speed and efficiency of the exchange network. At predetermined time intervals, each user will send their most up to date chain of transactions representing the net change in assets over the time-period to a centralized exchange for compilation and the other networks of users. The centralized exchange may document and store the complete ledger in order to mitigate the threat of fraudulent transactions. The exact specifications and definition of the transactions are defined therein. The system may be peer-to-peer and transactions can take place between users directly, without an intermediary. These transactions may be verified by network nodes and recorded in a distributed ledger that houses hash codes representing the commodity. When a transaction is made between two parties, a block in the ledger is updated when two or more entities not involved in the transaction authenticate a trade. Once a trade is authenticated, an object (currency, stock, etc.) changes ownership. This negates the need for a physical transferable object.

Market participants may subscribe to the exchange platform 2600 in order to trade commodities.

Figure 27:
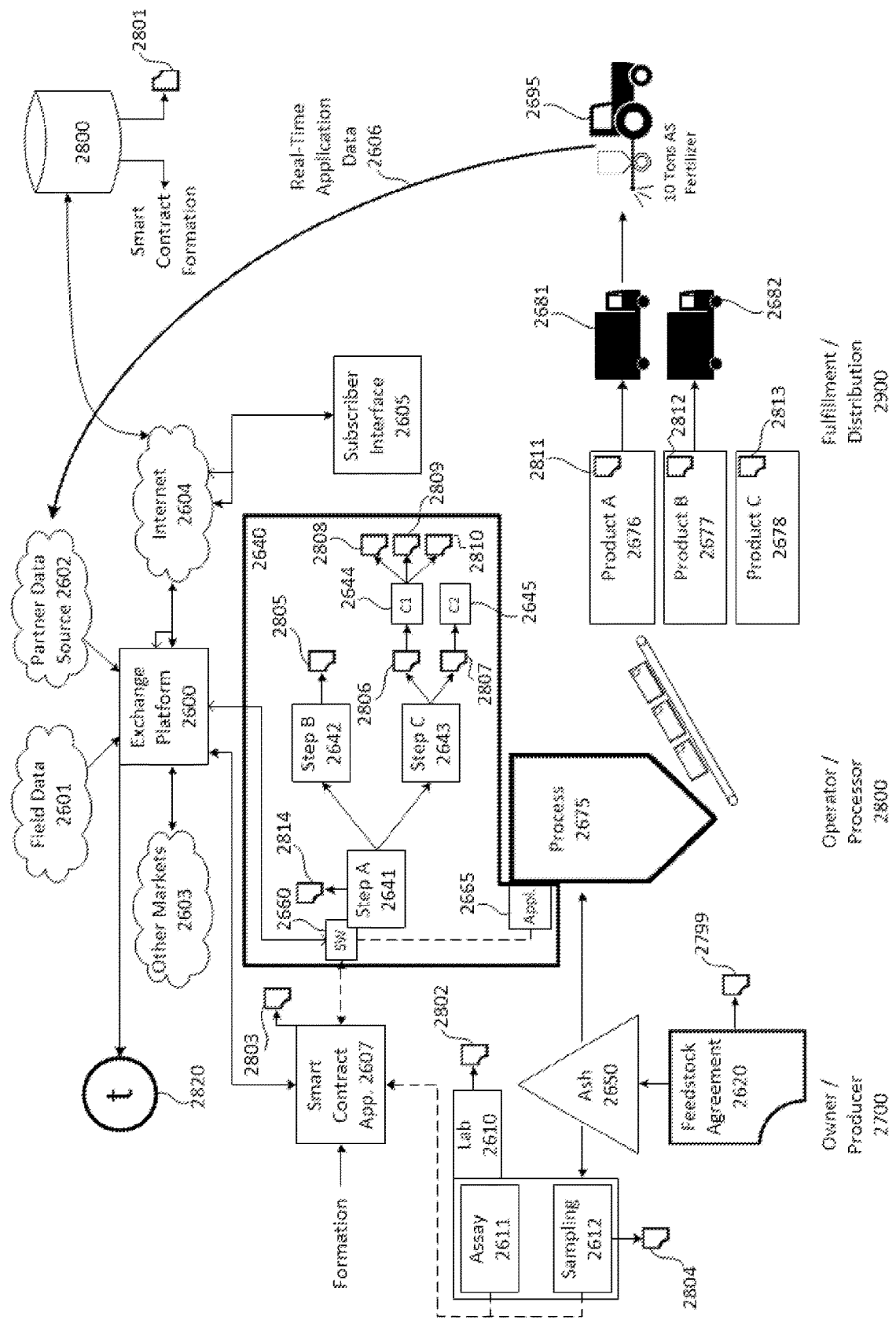
FIG. 27 depicts an alternate embodiment of the system of systems of FIG. 26.

In a non-limiting example of the Tokenization process, FIG. 27 depicts block 2800 as a distributed data base record that stores what is called a distributed ledger 2801. The distributed ledger has two faces, a private face and a public face. The private face belongs to the exchange's owner and is used as a way to keep notes and private data secure from the public side. The ledger is created upon creation of a Token. The Token represents a present value of the underlying asset. As further example, a feedstock agreement is established at $T_1$ and documented in a datagram 2799. Datagram 2799 is then transmitted through a proprietary and secure network to the exchange 2600 for logging in the distributed ledger 2800. Once established, the ledger then publishes to the public side of the ledger a first posting in what would otherwise be known as the Blockchain for the asset. The asset has a value, but it is unknown at this point. At $T_2$ the commodity is evaluated, and, in the case of a mineral, sampled 2804, assayed, and documented at 2802. Each ach step is transmitted securely to the exchange, noting the ledger record it pertains to, is then sent to the distributed ledger database and entered as a new entry to the Blockchain, each entry represent a value change in the process of the underlying commodity, again in this case a mineral bearing substance.

At some point in the asset life, the commodity is designated to fulfil a supply contract also known as a smart contract. The smart contract is established with milestones that are or must be achieved throughout its process life. The smart contract is managed by the exchange owner as part of the exchange services; fees for this are paid directly to the exchange. All transactions created in the above process are sent to the distributed ledger and logged to either the public or private side depending on the records type.

As discussed earlier, the smart contract 2607 has the ability to execute certain tasks automatically, once the buy signal is released based on a buyer, the ledger sends a notification to the smart contract the initiate the process 2675 and process the raw materials per the ledgers records, i.e., gold, platinum, or bananas into banana bread, it makes no difference to the over lying control process and smart contract.

The smart contract 2607 sends an authorization the plant control processor 2640 running in appliance 2665. Logic software 2660 accepts the instruction and initiates the process. The acceptance of this process initiation is a one way event, there is no going back. As an example, assume the underlying process is to process cattle into beef, once the cow enters the stock yard, and processing plant, there is no going back, the process is committed to.

Steps 2641, 2642, 2643 each generate a data record of the process, these records as with the others is passed out of the plant to the plant control, and logged into the distributed ledger 2800 as a new record. Each phase of the process from start to finish may, or may not represent a value change, only the predetermined terms and conditions of the smart contract will affect value.

Next, the refined commodity is labeled and shipped. As an example, Product A could be sand in the form of silicon dioxide, Product B 2677 could be iron, and Product C 2678 could be gold, each by the smart contract will be individually reported back to the ledger as a process event, in the case of the formation of a finished product, the value from the smart contract will reflect in the record e.g. 2811, 2812, 2813.

In the final step 2900 fulfillment and distribution, the smart contract 2607 may have instructions to release funds on the shipment of the products FOB the shipping dock, that would mean, the asset owner, all the way down to the plant owner gets paid, the token is terminated and disbursed per the smart contract. Any services agreements, trucking agreements, e.g. 2681 and 2682 for transportation are paid as well. In one final step, the end user, consumer consumes the product, and reports back to the exchange through a partner data base, the product is gone, and needs more product, the cycle is repeated, the smart contract is established, and the next batch of product is processed.

A centralized network of servers may manage the distribution and shipping network of the rare earth metals. A distributed ledger offers unparalleled accuracy in supply chain management, consistently maintaining an accurate location in the process. It may limit or completely negate the potential loss of material in the process and further develop the intricate system.

In trading and sales operations, quantitative analysts work to determine prices, manage risk, and identify profitable opportunities. Historically this was a distinct activity from trading but the boundary between a desk quantitative analyst and a quantitative trader is increasingly blurred, and it is now difficult to enter trading as a profession without at least some quantitative analysis education. In the field of algorithmic trading it has reached the point where there is little meaningful difference. Front office work favors a higher speed to quality ratio, with a greater emphasis on solutions to specific problems than detailed modeling. FOQs typically are significantly better paid than those in back office, risk, and model validation. Although highly skilled analysts, FOQs frequently lack software engineering experience or formal training, and bound by time constraints and business pressures tactical solutions are often adopted.

Algorithmic trading, also called algo trading and black box trading, encompasses trading systems that are heavily reliant on complex mathematical formulas and high-speed computer programs to determine trading strategies. These strategies use electronic platforms to enter trading orders with an algorithm which executes pre-programmed trading instructions accounting for a variety of variables such as timing, price, and volume. Algorithmic trading is widely used by investment banks, pension funds, mutual funds, and other buy-side (investor-driven) institutional traders, to divide large trades into several smaller trades to manage market impact and risk.

Algorithmic trading may be used in any investment strategy or trading strategy, including market making, inter-market spreading, arbitrage, or pure speculation (including trend following). The architecture and functionality of smart contracts allow for the incorporation of subscriber strategies that apply algorithmic trading methods. The investment decision and implementation may be augmented at any stage with algorithmic support or may operate completely automatically.

Many types of algorithmic or automated trading activities can be described as high-frequency trading (HFT), which is a specialized form of algorithmic trading characterized by high turnover and high order-to-trade ratios. As a result, in February 2012, the Commodity Futures Trading Commission (CFTC) formed a special working group that included academics and industry experts to advise the CFTC on how best to define HFT.

HFT strategies utilize computers that make elaborate decisions to initiate orders based on information that is received electronically, before human traders are capable of processing the information they observe. Algorithmic trading and HFT have resulted in a dramatic change of the market microstructure, particularly in the way liquidity is provided.

Next generation trading platforms may require information about the trading environment, and the relationship to them. The performance of the described trading platform using cryptographic hashes and smart contracts provides the opportunity to limit market contagion resulting from HFT techniques, where a feedback spiral emerges with no apparent external cause. This information may be generated from multiple sources to include data from social media, global predictions, etc. These data sources may generate information about the environment including measurements and measurement classification. These systems are similar to those in planetary physics.

The process of trading is not much different today then is was 30 years ago, just incredibly faster; features or applications are specified for a desired software product they are coded in any one of a number of languages, competitively purchased; integrated into an existing ecosystem; and implemented as another product. If another feature is desired, it is integrated into yet another application or code block; this approach is referred to as "federated" systems. A key tenant to low cost systems in the future may be a deliberate movement away from federated features and systems, to fully integrated systems design and integrated systems.

Now with a focus on active this new platform, the data required to support new trading features are to some extent common; a data type 1; data type 2. In either case, simply sharing data from the disparate data sources to improve knowledge of the trading environment requires re-thinking how disparate data can be processed, in particular consideration for the fusion of data into information.

Those skilled in the art of state estimation, robotics, advanced defense avionics understand academically that data-fusion is the art of combining data or data derived from disparate sources such that the resulting information is in some sense "better" than would be possible when these sources were used individually. This process is predicated on the covariance (or the measure of how much two variables vary together) of non-independent sources. The term "better" in the case above can mean more accurate, more complete, more dependable, or refer to the result of an emerging view or state estimation.

The data sources for a fusion process are not specified to originate from identical sources which may or may not be spatially and temporally aligned. Further one can distinguish direct fusion, indirect fusion and fusion of the outputs of the former two. Direct fusion is the fusion of data from a set of heterogeneous or homogeneous data sources and history values of data, while indirect fusion uses information sources like a prior knowledge about the data and human input. Sensor fusion is also known as information fusion through an implementation of the probability theory.

Probability theory is the mathematical study of phenomena characterized by randomness or uncertainty. More precisely, probability is used for modeling situations when the result of a measurement, realized under the same circumstances, produces different results. Mathematicians and actuaries think of probabilities as numbers in the closed interval from 0 to 1 assigned to "events" whose occurrence or failure to occur is random. Two crucial concepts in the theory of probability are those of a random variable and of the probability distribution of a random variable.

Implementing the features described above with data available requires reliable real-time estimates of system state. Unfortunately, the complete state is not always observable. State Estimation takes all the data obtained and uses it to determine the underlying behavior of the system at any point in time. It includes fault detection, isolation and continuous system state estimation.

There are two parts to state estimation: modeling and algorithms. The overall approach is to use a model to predict the behavior of the system in a particular state, and then compare that behavior with the actual measurements from the instruments to determine which state or states is the most likely to produce the observed system behavior.

This is not well understood or currently widely implemented in the trading industry, today the majority of systems, algorithms used or understood and practiced is that logical decisions made linearly and deterministically. If use cases require higher confidences in specific data sets, the data sets need to be better resulting in the undesired effect of additional cost and schedule increases. The trading environment today is neither linear nor deterministic; use cases are infinite; and the perverse variability of the data and potential changes cannot be modeled. The variability of the problem identified above includes aspects other than just spatial; temporal relationships are part of the fundamental intellectual structure (together with space and number) within which events must be sequenced, quantify the duration of events, quantify the intervals between them, and compare the state of objects.

Sharing information and data with other applications is anticipated and desired; however data received and reported is historical in nature and received asynchronously. Timing errors can induce more error in the system than bad data. These and other issues can be addressed with the introduction of a suite of algorithms based on re-thinking the approach of federated applications and focusing on an integrated systems solution based on state estimation.

With respect to systems design, methods and tools must be developed to support the inevitable evolution about to happen in the global trading industry, an evolution from federated systems to fully integrated; the trading industry is not ready nor are they aware of the steps required. As it stands today, there is much art published documenting the research and development in the area of procedure analysis and design. This patent describes a system and methods necessary to implement a methodology that may facilitate and support advanced trading systems design, test, verification, and validation.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

The embodiments of the invention in which an exclusive property or privilege is claimed are defined as follows:

1. A system comprising:
    a first server comprising:
        a first distributed ledger comprising first data for a trade of an object;
        a first router with a first distributed object broker proxy to transmit the first distributed ledger;
    a second server comprising:
        a second distributed ledger comprising second data for the trade of the object;
        a second router with a second distributed object broker proxy to transmit the second distributed ledger;
    a third server comprising a third distributed object broker proxy to:
        receive the first distributed ledger and the second distributed ledger;
        authenticate the trade when the first data of the first distributed ledger matches the second data of the second distributed ledger and store data for the trade in a master ledger;
    wherein the first router, the second router, and the third server are configured to only communicate with devices having a distributed object broker proxy.

2. The system of claim 1 wherein the third server transmits a confirmation code to the first router and the second router when the trade is authenticated to enable the object of the trade to be traded again.

3. The system of claim 1 wherein the object comprises one of a currency, a stock, and a precious metal.

4. The system of claim 1 wherein the object changes ownership upon authentication of the trade.

5. The system of claim 1 wherein the master ledger is a blockchain ledger.

6. The system of claim 1 wherein the first distributor ledger and the second distributed ledger are blockchain ledgers.

7. The system of claim 1, wherein the third server authenticates the trade using a blockchain process.

* * * * *